United States Patent [19]

Yoshida et al.

[11] Patent Number: 5,774,345
[45] Date of Patent: Jun. 30, 1998

[54] SWITCHING POWER SUPPLY WITH SURGE CURRENT AND SURGE VOLTAGE PREVENTION

[75] Inventors: Koji Yoshida, Hirakata; Takuya Ishii, Suita; Hiroyuki Handa, Hirakata, all of Japan

[73] Assignee: Matsushita Electric Industrial Co., Ltd., Osaka-fu, Japan

[21] Appl. No.: 725,366

[22] Filed: Oct. 3, 1996

[30] Foreign Application Priority Data

Oct. 4, 1995 [JP] Japan ................................... 7-257382

[51] Int. Cl.$^6$ ................................................ H02M 3/335
[52] U.S. Cl. .......................... 363/17; 363/98; 363/132
[58] Field of Search .............................. 363/17, 98, 132, 363/56; 327/309, 318

[56] References Cited

U.S. PATENT DOCUMENTS

| | | | |
|---|---|---|---|
| 4,849,873 | 7/1989 | Vanderhelst | 363/55 |
| 4,926,302 | 5/1990 | Harada et al. | 363/16 |
| 5,063,488 | 11/1991 | Harada et al. | 363/16 |
| 5,343,378 | 8/1994 | Tohya | 363/21 |
| 5,345,376 | 9/1994 | Nourbakhsh | 363/62 |
| 5,406,177 | 4/1995 | Nerone | 315/307 |

*Primary Examiner*—Edward Tso
*Assistant Examiner*—Shawn Riley
*Attorney, Agent, or Firm*—Panitch Schwarze Jacobs & Nadel, P.C.

[57] ABSTRACT

A direct current output voltage is switched by two switching units and a current alternately changing directions is supplied to a primary winding of a transformer. An alternating voltage induced in a secondary winding of the transformer is rectified and smoothed, and is applied to a control circuit. A bidirectional switching unit is connected in parallel with the primary winding, and is controlled by the control circuit so that the primary winding is short-circuited by the bidirectional switching unit and an exciting energy of the transformer is held continuously.

8 Claims, 16 Drawing Sheets ns5,774,345

SWITCHING POWER SUPPLY WITH SURGE CURRENT AND SURGE VOLTAGE PREVENTION

FIELD OF THE INVENTION AND RELATED ART STATEMENT

1. Field of the Invention

The present invention relates to a switching power supply apparatus for supplying a stabilized direct current output voltage to industrial and consumer electronics apparatus.

2. Prior Art

Recently, a small-sized switching power supply apparatus having a high stability and high efficiency is desired to meet demands of cost reduction, miniaturization, improvement of performance and energy saving of electronics apparatus.

A first prior art switching power supply apparatus is described hereafter. FIG. 13 is a prior art circuit diagram of a switching power supply apparatus 1A of half bridge converter type. Referring to FIG. 13, a voltage of a direct current source 1 is represented by $V_{IN}$. The direct current source 1 is connected to input terminals 2A and 2B of the switching power supply apparatus 1A. A serially-coupled pair of a first switching element 3 and a second switching element 5 is connected across the input terminals 2A and 2B. The first and second switching elements 3 and 5 alternately turn-ON and turn-OFF.

A serially-coupled pair of a first capacitor 7 and a second capacitor 8 is connected across the input terminals 2A and 2B. A potential at the junction 7A between the first and second capacitors 7 and 8 is represented by $V_C$. A transformer 9 comprises a primary winding 9A, a first secondary winding 9B and a second secondary winding 9C. A turn ratio among the primary winding 9A, the first secondary winding 9B and the second secondary winding 9C is set to n:1:1 (n: real number). One end of the primary winding 9A is connected to the junction 5A between the first and second switching elements 3 and 5, and another end is connected to the junction 7A of the first and second capacitors 7 and 8. A first rectifying diode 14 and a second rectifying diode 15 are connected to the first secondary winding 9B and the second secondary winding 9C at respective anodes. The cathodes of the first and second rectifying diodes 14 and 15 are connected in common.

A serially-coupled pair of an inductor element 16 and a smoothing capacitor 17 is connected to the cathodes of the first and second rectifying diodes 14 and 15 at the end of the inductor element 16, and connected to the junction 9E between the first and second secondary windings 9B and 9C of the transformer 9 at the end of the smoothing capacitor 17. A voltage rectified by the first and second rectifying diodes 14 and 15 is smoothed by the inductor element 16 and the capacitor 17. Capacitance of the smoothing capacitor 17 is sufficiently large and a direct current output voltage $V_{OUT}$ is output to output terminals 18A and 18B. A load 19 is coupled to the output terminals 18A and 18B and consumes electric power. The output terminals 18A and 18B are connected to input terminals of a control circuit 20, and the direct current output voltage $V_{OUT}$ is directed by the control circuit 20. The control circuit 20 controls the first and second switching elements 3 and 5 with a predetermined ON-OFF ratio so as to stabilize the direct current output voltage $V_{OUT}$.

Operation of the switching power supply apparatus configured above is described hereafter with reference to waveform diagrams in FIG. 14. Referring to FIG. 14, driving pulse signals $v_{C1}$ and $v_{C2}$ are control signals of the first and second switching elements 3 and 5, respectively A voltage $V_D$ is applied to the first switching element 3 Currents $i_{D1}$ and $i_{D2}$ pass through the first and second switching elements 3 and 5, respectively.

When the first switching element 3 turns ON at time $T_1$, the voltage $V_C$ is applied to the primary winding 9A of the transformer 9, and a voltage $V_C/n$ (n is the turn ratio of the primary winding 9A to the first secondary winding 9B) is induced in the first secondary winding 9B. Consequently, the first rectifying diode 14 turns ON and the second rectifying diode 15 turns OFF, and a voltage $[V_C/n-V_{OUT}]$ is applied to the inductor element 16. The current $i_{D1}$ passing through the first switching element 3 is the sum of an exciting current of the transformer 9 and a converted component current, which is the component such that an exciting current of the inductor element 16 is converted into the current of the primary winding 9A.

When the first switching element 3 turns OFF at time $T_2$, a secondary current of the transformer 9 is divided into a current passing through the first secondary winding 9B and a current passing through the second secondary winding 9C so as to continue an exciting energy of the transformer 9. Consequently, the first and second rectifying diodes 14 and 15 turn ON, and induced voltages of the first and second secondary windings 9B and 9C fall to zero. Then, the voltage $V_{OUT}$ is applied to the inductor element 16.

When the second switching element 5 turns ON at time $T_3$, a voltage $[V_{IN}-V_C]$ is applied to the primary winding 9A of the transformer 9, and a voltage $[(V_{IN}-V_C)/n]$ is induced in the second secondary winding 9C of the transformer 9. Consequently, the first rectifying diode 14 turns OFF and the second rectifying diode 15 turns ON, and a voltage $[(V_{IN}-V_C)/n-V_{OUT}]$ is applied to the inductor element 16. The current $i_{D2}$ passing through second switching element 5 is the sum of the exciting current of the transformer 9 and the converted component current, which is the component such that the exciting current of the inductor element 16 is converted into the component current of the primary winding 9A.

When the second switching element 5 turns OFF at time $T_4$, the secondary current of the transformer 9 is divided into the current passing through the first secondary winding 9B and the current passing through the second secondary winding 9C so as to continue the exciting energy of the transformer 9. Consequently, the first and second rectifying diodes 14 and 15 turn ON, and the induced voltages of the first and second secondary windings 9B and 9C fall to zero. Then the voltage $V_{OUT}$ is applied to the inductor element 16 in the opposite direction to the direction when the second switching unit 5 is in an ON-state.

When the first switching element 3 turns ON at time $T_5$, the voltage $V_C$ is applied to the primary winding 9A of the transformer 9. Then the above-mentioned operation is repeated.

In the above-mentioned operation, an ON-period P ($T_1$ to $T_2$) of the first switching element 3 is selected equally to an ON-period ($T_3$ to $T_4$) of the second switching element 5, and the ON-period is designated as $P_{ON}$. In a similar manner, an OFF-period ($T_2$ to $T_3$) is selected equally to an OFF-period ($T_4$ to $T_5$), and the OFF-period is designated as $P_{OFF}$. A ratio $P_{ON}/P_{OFF}$ is designated as an "ON-OFF ratio". When the ON-period and OFF-period are selected above, a state of magnetic flux of the transformer 9 returns to an initial a state every one cycle ($T_1$ to $T_5$) in stable operation and is reset.

The resetting of state is called a "reset condition". From the reset condition, equation (1) is derived.

$$(V_{IN}-V_C) \times P_{on} = V_C \times P_{on} \qquad (1)$$

From equation (1), $V_C$ is represented as follows:

$$V_C = V_{IN}/2$$

From the reset condition of which the state of magnetic flux of the inductor element 16 returns to an initial state, equation (2) is derived.

$$(V_{IN}/2 - V_{OUT}) \times P_{ON} = V_{OUT} \times P_{OFF} \qquad (2)$$

From equation (2), $V_{OUT}$ is represented as follows:

$$V_{OUT} = \delta \times V_{IN}/2,$$

where, $\delta = P_{ON}/(P_{ON}+P_{OFF})$.

The output voltage $V_{OUT}$ can be stabilized by adjusting the ON-OFF ratios of the first and second switching elements 3 and 5.

The circuit configuration shown in FIG. 13 has features that a voltage exceeding the input voltage $V_{IN}$ is not applied to the first and second switching elements 3 and 5 and the transformer 9 is not excited by a direct current.

A second prior art switching power supply apparatus is described hereafter. FIG. 15 is a prior art circuit diagram of a switching power supply apparatus 31A of push-pull converter type. Referring to FIG. 15, the voltage of the direct current source 1 is represented by $V_{IN}$. The direct current source 1 is connected to the input terminals 2A and 2B of the switching power supply apparatus 31A. A transformer 27 comprises a first primary winding 27A, a second primary winding 27B, a first secondary winding 27C and a second secondary winding 27D. A turn ratio among the first primary winding 27A, the second primary winding 27B, the first secondary winding 27C and the second secondary winding 27D is set to n:n:1:1. A serially-coupled pair of the first primary winding 27A and the first switching element 3 is connected across the input terminals 2A and 2B. Moreover, a serially-coupled pair of the second primary winding 27B and the second switching element 5 is connected across the input terminals 2A and 2B.

The anodes of the first rectifying diode 14 and the second rectifying diode 15 are connected to the first secondary winding 27C and the second secondary winding 27D, respectively. The cathodes of the first and second rectifying diodes 14 and 15 are connected in common. The inductor element 16 is connected in series with the rectifying capacitor 17, and the end of the inductor element 16 is connected to the cathodes of the first and second rectifying diodes 14 and 15. The end of the rectifying capacitor 17 is connected to the junction 27E between the first secondary winding 27C and the second secondary winding 27D of the transformer 27. A voltage rectified by the first rectifying diode 14 and the second rectifying diode 15 is smoothed by the inductor element 16 and the rectifying capacitor 17, and is output to the output terminals 18A and 18B. The smoothing capacitor 17 has a sufficiently large capacitance, and a direct current output voltage $V_{OUT}$ is output to the output terminals 18A and 18B. The load 19 is connected to the output terminals 18A and 18B, and consumes electric power.

The direct current output voltage $V_{OUT}$ is detected by a control circuit 29. The control circuit 29 controls the first switching element 3 and the second switching element 5 with a predetermined ON-OFF ratio so as to stabilize the direct current output voltage $V_{OUT}$.

Operation of the switching power supply apparatus configured above is described hereafter with reference to waveform diagrams in FIG. 16. Referring to FIG. 16, the driving pulse signals $v_{C1}$ and $v_{C2}$ are control signals of the first switching element 3 and the second switching element 5, respectively. A voltage $v_{D1}$ is applied to the first switching element 3. A voltage $v_{D2}$ is applied to the second switching element 5. Currents $i_1$ and $i_2$ pass through the first switching element 3 and the second switching element, respectively.

When the first switching element 3 turns ON at time $T_1$, the input voltage $V_{IN}$ is applied to the first primary winding 27A of the transformer 27, and a voltage $V_{IN}/n$ is induced in the first secondary winding 27C. Consequently, the first rectifying diode 14 turns ON, and the second rectifying diode 15 turns OFF. A voltage $[V_{IN}/n - V_{OUT}]$ is applied to the inductor element 14. The current $i_1$ is the sum of an exciting current of the transformer 27 and a converted component current, which is the component such that an exciting current of the inductor element 14 is converted into the current passing through the first primary winding 21A, and passes through the first switching element 3.

When the first switching element 3 turns OFF at $T_2$, a secondary current of the transformer 27 is divided into a current passing through the first secondary winding 27C and a current passing through the second secondary winding 27D so as to continue an exciting energy of the transformer 27. Consequently, the first rectifying diode 14 and the second rectifying diode 15 turn ON, and the induced voltages of the first secondary winding 27C and the second secondary winding 27D fall to zero. The voltage $V_{OUT}$ is applied to the inductor element 16 in the opposite direction to the direction when first switching element 3 is in an ON-state.

When the second switching element 5 turns ON at time $T_3$, the voltage $V_{IN}$ is applied to the second primary winding 27B of the transformer 27, and the voltage $V_{IN}/n$ is induced in the second secondary winding 27D. Consequently, the first rectifying diode 14 turns ON, and the second rectifying diode 15 turns OFF, and the voltage $[V_{IN}/n - V_{OUT}]$ is applied to the inductor element 16. The current $i_2$ is the sum of the exciting current of the transformer 27 and the converted component current, which is the component such that the exciting current of the inductor element 16 is converted into the current of the second primary winding 27B, and passes through the second switching element 5.

When the second switching element 5 turns OFF at $T_4$, the secondary current is divided into the current passing through the first secondary winding 27C and the current passing through the second secondary winding 27D so as to continue the exciting energy of the transformer 27. Consequently, the first rectifying diode 14 and the second rectifying diode 15 turn ON, and the induced voltages of the first secondary winding 27C and the second secondary winding 27D fall to zero. The voltage $V_{OUT}$ is applied to the inductor element 16 in the opposite direction to the direction in the case of ON-state of the second switching element 5. An ON period ($T_1$ to $T_2$) of the first switching element 3 is selected which is equal to an ON period ($T_3$ to $T_4$) of second switching element 5, and is designated as $P_{ON}$. In a similar manner, an OFF period ($T_2$ to $T_3$) is selected which is equal to an OFF period ($T_4$ to $T_5$), and is designated as $P_{OFF}$. When the ON period and the OFF period are selected as mentioned above, equation (3) is derived by the reset condition of inductor element 14.

$$(V_{IN}-V_{OUT}) \times P_{ON} = V_{OUT} \times P_{OFF} \qquad (3)$$

From equation (3), $V_{OUT}$ is represented as follows:

$$V_{OUT} = \delta \times V_{IN},$$

where, $\delta = P_{ON}/(P_{ON}+P_{OFF})$.

The output voltage $V_{OUT}$ is stabilized by adjusting the ON-OFF ratio $P_{ON}/P_{OFF}$ of the first switching element 3 and the second switching element 5.

In the first and second prior art switching power supply apparatus mentioned above, when the first switching element 3 or the second switching element 5 turns ON, electric charges stored in parasitic capacitances of the first and second switching elements 3 and 5 and in distributed capacitance of the transformer 9 shown by dotted lines in FIG. 13 and FIG. 15 are discharged because the first switching element 3 or the second switching element 5 short-circuits the parasitic capacitances. Consequently, a surge current $S_I$ is generated as shown in FIG. 14 and FIG. 16, noise is generated and an electric power is dissipated. Furthermore, when the first and second switching elements 3 and 5 turn OFF, a surge voltage $S_V$ is generated by leakage inductance of the transformer 9 or parasitic inductance of lead wires.

Since the surge current $S_I$ is generated at turn-ON operation of the first and second switching elements 3 and 5, the number of generations of the surge current $S_I$ increases in proportion to a switching frequency of the control circuit 20 or 29. Therefore, the power dissipation and the noise are increased by increase of the switching frequency.

Due to the above-mentioned reason, it is difficult to achieve, increase of the switching frequency is difficult in the conventional switching power supply apparatus. The switching frequency is preferably increased as high as possible in the switching power supply apparatus. A capacity of the transformer 9 and capacitances of the capacitors 7 and 8 can be reduced by the increase of the switching frequency, and the switching power supply apparatus can be miniaturized.

OBJECT AND SUMMARY OF THE INVENTION

An object of the present invention is to provide a switching power supply apparatus of wherein electric power loss is reduced by preventing generation of a surge current and a surge voltage, efficiency is improved and the noise is reduced.

The switching power supply apparatus in accordance with the present invention comprises a serially-coupled pair of a first switching means and a second switching means which alternately turn-ON and turn-OFF and are connected to a power source, a serially-coupled pair of a first capacitor and a second capacitor connected to the power source, a transformer comprising a primary winding connected to the junction between the first capacitor and the second capacitor at one end and connected to the junction between the first switching means and the second switching means at another end and at least one secondary winding, bidirectional switching means connected in parallel with the primary winding of the transformer, rectifying and smoothing means connected to at least one secondary winding of the transformer, and control means for receiving an output of the rectifying and smoothing means and for applying control signals to the bidirectional switching means so that the bidirectional switching means turns ON in a period of nonconductive states of the first switching means and the second switching means, and a current of the primary winding of the transformer is held continuously.

The switching power supply apparatus in accordance with the present invention comprises a first switching means and a second switching means which alternately turn-ON and turn-OFF, and a transformer having a first primary winding and a second primary winding and at least one secondary winding. A serially-coupled pair of the first primary winding and the first switching means is connected to the power source, and a serially-coupled pair of the second primary winding and the second switching means is connected to the power source. Bidirectional switching means is connected between the junction of the first switching means and the first primary winding and the junction of the second switching means and the second primary winding.

The transformer further comprises an auxiliary winding, and the bidirectional switching means is connected in parallel with the auxiliary winding of the transformer.

By turn-ON of the bidirectional switching means, energy stored in the transformer can be held for a period from turn-OFF of the first switching means to immediately before turn-ON of the second switching means and a period from turn-OFF of the second switching means to turn-ON of the first switching means. Moreover, an electric charge stored in a parasitic capacitance coupled equivalently parallel with each switching means is discharged immediately before turn-ON of the switching means. Then the switching element turns ON. Therefore, surge current is not generated.

The surge voltage induced by influence of leakage inductance of the transformer at turn-OFF of the first and second switching means is not generated by a cramp action of the bidirectional switching means which short-circuits the primary winding of the transformer.

Moreover, in the switching power supply apparatus of the present invention, the surge voltages are not generated at turn-ON and turn-OFF of the bidirectional switching means. Therefore, a small-sized switching power supply apparatus having a high efficiency, low noise and a high switching frequency is realizable.

DESCRIPTION OF THE PREFERRED EMBODIMENT

Preferred embodiments of the present invention will be described hereafter with reference to FIG. 1 to FIG. 12.

[First Embodiment]

Figure 1:
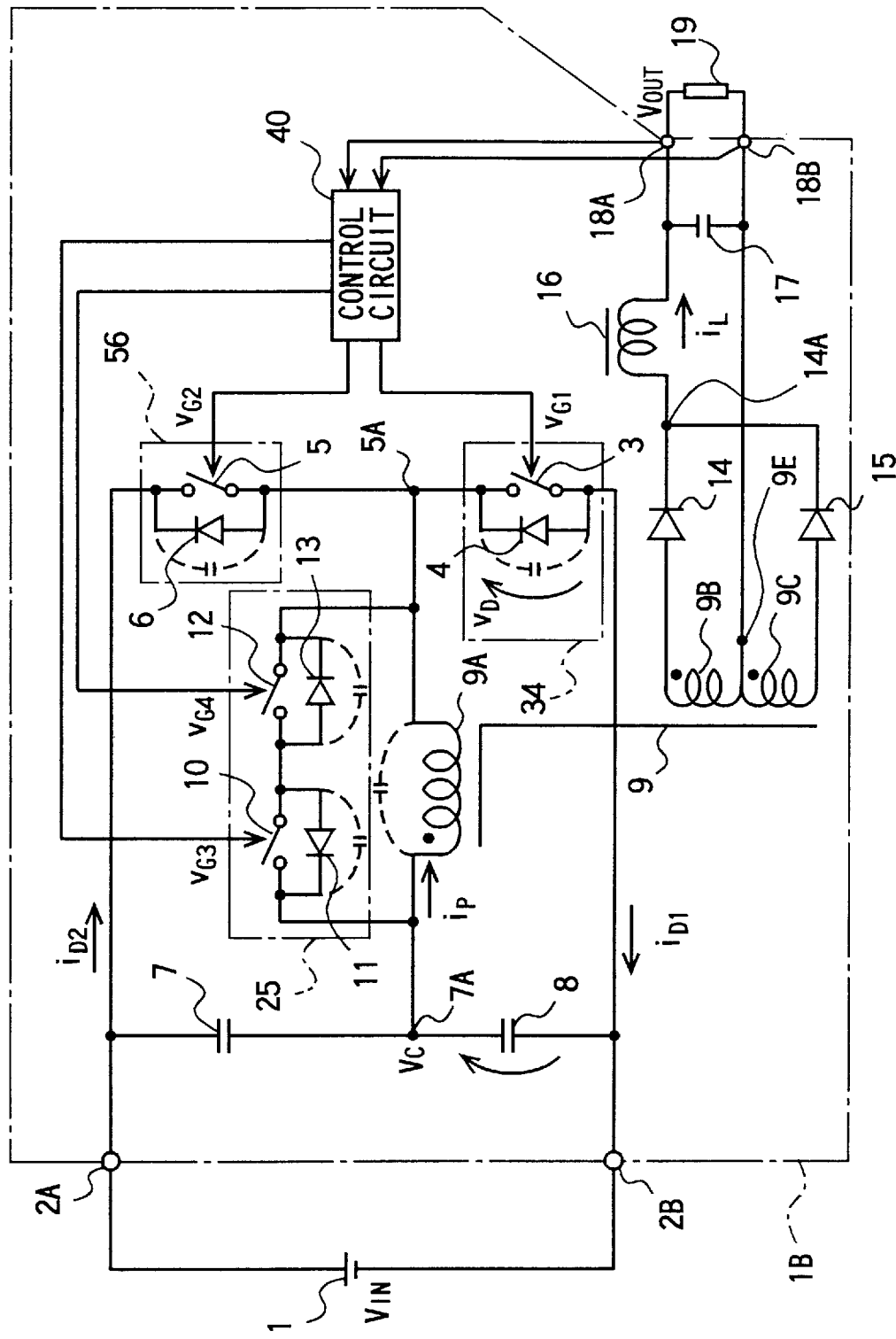
FIG. 1 is a circuit diagram of the switching power supply apparatus of a first embodiment of the present invention.

A first embodiment of the present invention is described with reference to FIG. 1 to FIG. 4. FIG. 1 is a circuit diagram of a switching power supply apparatus of the first embodiment of the present invention.

Voltage of a direct current source 1 is represented by $V_{IN}$. Input terminals 2A and 2B of the switching power supply apparatus 1B are connected to the direct current source 1. A first switching unit 34 comprises a parallel-coupled pair of a first switching element 3 and a first diode 4. A second switching unit 56 comprises a parallel-coupled pair of a second switching element 5 and a second diode 6. The first switching unit 34 is coupled in series with the second switching unit 56. The serially-coupled pair of the first switching unit 34 and the second switching unit 56 is connected across the input terminals 2A and 2B.

A first capacitor 7 is coupled in series with a second capacitor 8. The serially-coupled pair of the first and second capacitors 7 and 8 is connected across the input terminals 2A and 2B. Voltage at the junction 7A between the first and second capacitors 7 and 8 is represented by $V_C$. A transformer 9 comprises a primary winding 9A, a first secondary winding 9B and a second secondary winding 9C. Turn ratio among the primary winding 9A, the first secondary winding 9B and the second secondary winding 9C is set to n:1:1 (n: real number). The primary winding 9A is connected to the junction 7A between the first and second capacitors 7 and 8 at one end, and is connected to the junction 5A between the first and second switching units 34 and 56 at another end.

The anode of a first rectifying diode 14 is connected to one end of the first secondary winding 9B of the transformer 9. The anode of a second rectifying diode 15 is connected to one end of the second secondary winding 9C of the transformer 9. The cathodes of the first and second rectifying diodes 14 and 15 are connected in common. An inductor element 16 is connected to the cathodes of the first and second rectifying diodes 14 and 15 at one end. Another end of the inductor element 16 is connected to one end of a smoothing capacitor 17. Another end of the smoothing capacitor 17 is connected to the junction 9E between the first and second secondary windings 9B and 9C. Voltages induced in the first and second secondary windings 9B and 9C are rectified by the first and second rectifying diodes 14 and 15 and smoothed by the inductor element 16 and the smoothing capacitor, and output voltage $V_{OUT}$ is supplied to a load 19 through output terminals 18A and 18B. The above-mentioned configuration is substantially similar to that of the half bridge converter in the first prior art switching power supply apparatus.

A bidirectional switching unit 25 comprises a parallel-coupled pair of a third switching element 10 and a third diode 11, and a parallel-coupled pair of a fourth switching element 12 and a fourth diode 13. The parallel-coupled pair of the third switching element 10 and the third diode 11 is connected in series with the parallel-coupled pair of the fourth switching element 12 and the fourth diode 13 in a manner that the anode of the third diode 11 is connected to the anode of the fourth diode 13 The bidirectional switching unit 25 is capable of passing a current in a first direction through the fourth diode 13 by turn-ON of the third switching element 10. On the contrary, the bidirectional switching unit 25 is capable of passing the current in the second direction opposite to the first direction through the third diode 11 by turn-ON of the fourth switching element 12. Furthermore, the bidirectional switching unit 25 is capable of passing the current in both directions by turn-ON of both third and fourth switching elements 10 and 12. The bidirectional switching unit 25 is connected in parallel with the primary winding 9A of the transformer 9.

A control circuit 40 detects the output voltage $V_{OUT}$ at the output terminals 18A and 18B. The control circuit 40 generates control signals which control the first and second switching elements 3 and 5 and the third and fourth switching elements 10 and 12 by changing an ON-OFF ratio so that the output voltage $V_{OUT}$ becomes constant. The switching elements 3, 5, 10 and 12 are preferably configured by semiconductor elements. For example, a bipolar transistor or an FET is used as the semiconductor element. In the case of the FET, the diode 4, 6, 11 or 13 is not needed, because the FET has a built-in diode connected in parallel therewith in the same package.

Figure 4:
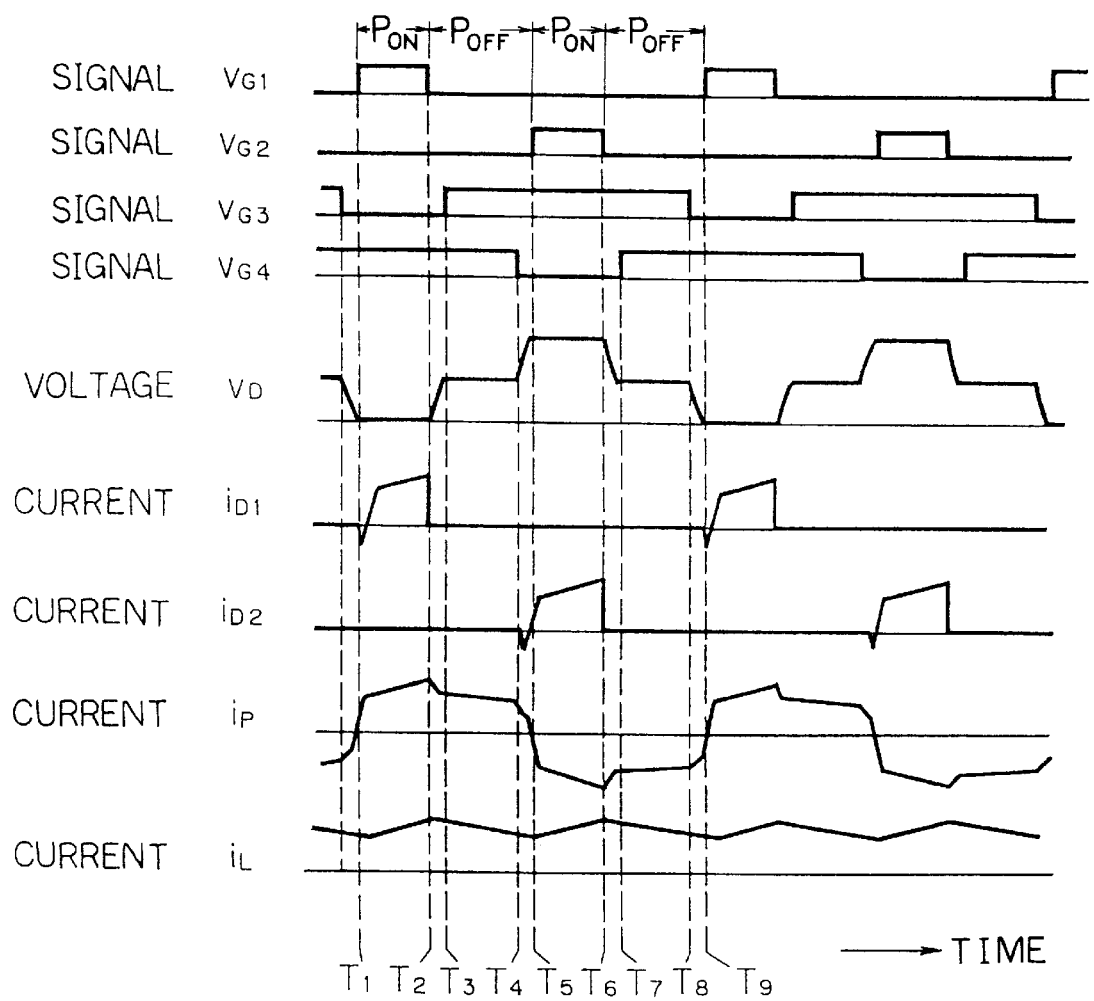
FIG. 4 is a waveform diagram of operation of the switching power supply apparatus of the first embodiment.

Operation of the switching power supply apparatus configured above is described hereafter with reference to waveform diagrams in FIG. 4.

Referring to FIG. 4, driving pulse signal $v_{C1}$ is applied to the first switching element 3 from the control circuit 40. Driving pulse signal $v_{C2}$ is applied to the second switching element 5 from the control circuit 40. Driving pulse signal $v_{c3}$ is applied to the third switching element 10 and a driving pulse signal $v_{c4}$ is applied to the fourth switching element 12 from the control circuit 40. Voltage $v_D$ is applied to the first switching unit 34. Current $i_{D1}$ passes through the first switching unit 34. Current $i_{D2}$ passes through the second switching unit 56. Current $i_P$ passes through the primary winding 9A of the transformer 9. Current $i_L$ passes through the inductor element 16.

When the first switching element 3 is turned ON by input of the driving pulse signal $V_{C1}$ from the control circuit 40 at time $T_1$, the voltage $V_C$ is applied to the primary winding 9A of the transformer 9. A voltage $V_C/n$ (n being the turn ratio of primary winding to secondary winding) is induced in the first secondary winding 9B of the transformer 9, and the rectifying diode 14 turns ON. Difference voltage $[V_C/n - V_{OUT}]$ is applied to the inductor element 16, and therefore a current passing through the inductor element 16 linearly increases. The current $i_P$ of the primary winding 9A of the transformer 9 is the sum of an exciting current of the transformer 9 and a converted component current, which is the component such that a current in the first secondary winding 9B is converted into a primary current. Therefore, the current $i_P$ linearly increases, and magnetic energy is stored in the transformer 9 and the inductor element 16. At this time, the second switching element 5 remains OFF, the third swathing element 10 remains OFF, and the fourth switching element 12 remains ON by controls of the control circuit 40. However these states do not influence the operation of the circuit because the second diode 6 and the third diode 11 are reverse-biased and hence remain OFF.

The driving pulse signal $v_{c1}$ of the control circuit 20 falls at time $T_2$, and the first switching element 3 turns OFF. A leakage inductance of the transformer 9 causes the current $i_P$ passing through the primary winding 9A to flow continuously. Therefore, the current $i_P$ charges or discharges parasitic capacitances shown by broken lines coupled equivalently parallel with the first and second switching units 34 and 56, the third switching unit 10 of the bidirectional switching unit 25, and the transformer 9. Consequently, the voltage $v_D$ applied to the first switching unit 34 increases. When the voltage $V_D$ exceeds the voltage $v_C$, the third diode 11 is turned ON by a voltage applied through the fourth switching element 12 of ON-state, and the bidirectional switching unit 25 becomes conductive.

The third switching element 10 is turned ON by the driving pulse signal $v_{c3}$ of the control circuit 20 at time $T_3$. A current passes through the third diode 11 and the third switching element 10. Operation of the bidirectional switching unit 25 does not change even if the current passes through the third diode 11 or the third switching element 10. At this time, the current $i_P$ of the primary winding 9A of the transformer 9 once decreases, because energy stored in the transformer 9 is consumed by charging to or discharging from the parasitic capacitances, but when the third diode 11 or the third switching element 10 turns ON, the primary winding 9A of the transformer 9 is short-circuited by the bidirectional switching unit 25, and energy stored in the leakage inductance and an exciting inductance of the transformer 9 is held. Here, the word "energy" represents energy stored in both the exciting inductance and the leakage inductance. Consequently, the voltages induced in the first and second secondary windings 9B and 9C of the transformer 9 fall to zero, and the voltage $V_{OUT}$ is applied to the inductor element 16. A secondary current of the transformer 9 is divided into a current passing through the first secondary winding 9B and a current passing through the second secondary winding 9C so as to continuously hold the energy. Therefore, the first and second rectifying diodes 14 and 15 turn ON.

When the fourth switching element 12 turns OFF and the bidirectional switching unit 25 becomes nonconductive at time $T_4$, the parasitic capacitances coupled equivalently parallel with the first and second switching units 34 and 56, the fourth switching element 12 of the bidirectional switching unit 25 and the transformer 9 are charged or discharged by the energy held in the transformer 9. Consequently, the voltage $v_D$ applied to the first switching unit 34 increases. When the voltage $v_D$ reaches the input voltage $V_{IN}$, the second diode 6 turns ON. The second switching element 5 is turned ON by input of the driving pulse signal $v_{C2}$ of the control circuit 20 at time $T_5$. The current $i_{D2}$ passes through the second diode 6 and the second switching element 5. Operation of the second switching unit 56 does not change even if the current $i_{D2}$ passes through the second diode 6 or through the second switching element 5.

The current $i_P$ passing through the primary winding 9A of the transformer 9 once decreases due to charging to or discharging from the parasitic capacitances, but when the second switching unit 56 turns ON, the voltage $[V_C-V_{IN}]$ is applied to the primary winding 9A and the current $i_P$ passing through the primary winding 9A rapidly decreases. When a sufficient inverse-current is supplied to the primary winding 9A of the transformer 9, the rectifying diode 14 turns OFF, and a voltage $[(V_{IN}-V_C)/n]$ is induced in the second secondary winding 9C. Consequently, a voltage $[(V_{IN}-V_C)/n-V_{OUT}]$ is applied to the inductor element 16, and the current $i_L$ passing through the inductor element 16 linearly increases. The current $i_P$ of the primary winding 9A of the transformer 9 linearly decreases because the current $i_P$ is the sum of the exciting current of the transformer 9 and a converted component current, which is the component such that the current passing through the secondary winding 9B is converted into the primary current. Then, an energy is stored in the transformer 9 and the inductor element 16. In this operation, the first switching element 3 remains OFF, the third switching element 10 remains ON and the fourth switching element 12 remains OFF by control of the control circuit 20, but operation of the switching power supply is not influenced because the first diode 6 and the fourth diode 13 are reverse-biased and remain OFF.

When the driving pulse signal $V_{c2}$ of the control circuit 20 falls and the second switching element 5 turns OFF at time $T_6$, the leakage inductance of the transformer 9 causes the current $i_P$ passing through the primary winding 9A to flow continuously. Therefore, the current $i_P$ charges to or discharges from the parasitic capacitances connected equivalently parallel with the first and second switching units 34 and 56, the third switching element 10 of the bidirectional switching unit 25 and the transformer 9. Consequently, the voltage $v_D$ applied to the first switching unit 34 decreases. When the voltage $v_D$ reaches the voltage $v_C$, the fourth diode 13 is turned ON by application of a voltage through the third switching element 10 of ON-state, and the bidirectional switching unit 25 becomes conductive.

The fourth switching element 12 is turned ON by the driving pulse signal $v_{c4}$ of the control circuit 40 at time $T_7$. Operation of the bidirectional switching unit 25 does not change even if the current passes through the fourth diode 13 or through the fourth switching element 12. The current $i_P$ passing through the primary winding 9A of the transformer 9 once increases when the energy stored in the transformer 9 is consumed by charging to or discharging from the parasitic capacitances as negative poled energy. Thereafter, when the fourth diode 13 or the fourth switching element 12 turns ON, the primary winding 19A is short-circuited, and the energy of negative polarity stored in the leakage inductance and the exciting inductance are held.

The induced voltages in the first and second secondary windings 9B and 9C fall to zero by short circuit of the primary winding 9A. Consequently, the voltage $V_{OUT}$ is applied to the inductor element 16. The secondary current is divided into a current passing through the first secondary winding 9B and a current which passes through the second secondary winding 9C of the transformer 9 so as to hold continuously the exciting energy of the transformer 9. Therefore, the first and second rectifying diodes 14 and 15 turn ON.

The bidirectional switching unit 25 is rendered nonconductive by turn-OFF of the third switching element 10 at time $T_8$. The electric charges stored in the parasitic capacitances coupled equivalently parallel with the first and second switching units 34 and 56, the fourth switching element 12 and the transformer 9 are charged or discharged by the energy held in the transformer 9. Consequently, the voltage $V_D$ applied to the first switching unit 34 decreases. When the voltage $V_D$ falls to zero, the first diode turns ON.

At time $T_9$, the driving pulse signal $V_{C1}$ of the control circuit 40 is applied to the first switching element 3, which turns ON. Even the current $i_{D1}$ passes through the first diode 4 or through the first switching element 3, operation of the first switching element 3 does not change.

The current $i_P$ passing through the primary winding 9A of the transformer 9 once increases to charge to or discharge from the parasitic capacitances, but when the first switching unit 34 turns ON, the voltage $v_C$ is applied to the primary winding 9A of the transformer 9, and the current $i_P$ of the primary winding 9A rapidly increases. After a sufficient current is supplied to the primary winding 9A of the transformer 9, the second rectifying diode 15 turns OFF, and the voltage $v_C/n$ is induced in the first secondary winding 9B. Therefore, the voltage $[(V_{IN}-V_C)/n-V_{OUT}]$ is applied to the inductor element 16. Then, the above-mentioned operation is repeated.

An ON-period ($T_1$ to $T_2$) of the first switching unit 34 is selected which is equal to an ON-period ($T_5$ to $T_6$) of the second switching unit 56 and they are designated as "$P_{ON}$". An OFF-period ($T_2$ to $T_5$) which is measured from a turn-OFF of the first switching unit 34 to subsequent turn-ON of the second switching unit 56, is selected which is equal to an OFF-period ($T_6$ to $T_9$) which is measured from a turn-OFF of the second switching unit 56 to subsequent turn-ON of the first switching unit 34, and they are designated as "$P_{OFF}$". An ON-OFF ratio is defined by $P_{ON}/P_{OFF}$. A state of magnetic flux of the transformer 9 or the inductor element 16 returns to an initial state every one cycle ($T_1$ to $T_9$) and is reset. Hereinafter, the state of reset is called 9 "reset condition". Equation (3) is derived from the reset condition of the transformer 9.

$$(V_{IN}-V_C) \times P_{ON} = V_C \times P_{ON} \qquad (3)$$

When time periods from time $T_2$ to time $T_3$, from time $T_4$ to time $T_5$, from time $T_6$ to time $T_7$ and from time $T_8$ to time $T_9$ are disregarded because these time periods are negligibly short, equation (4) is derived from the reset condition of the inductor element 16.

$$[(V_{IN}-V_C)/n-V_{OUT}] \times P_{ON} = V_{OUT} \times P_{OFF} \qquad (4)$$

Therefore, from equation (4), $V_C$ and $V_{OUT}$ are represented as follows:

$$V_C = V_{IN}/2,$$

$$V_{OUT} = \delta V_{IN}/2n,$$

where, $\delta = P_{ON}/(P_{ON}+P_{OFF})$.

As shown by the above-mentioned equations, the output voltage $V_{OUT}$ can be controlled by adjusting the ON-OFF ratio $P_{ON}/P_{OFF}$ of the first and second switching units 34 and 56. The above-mentioned expression of $\delta$ is equal to the same expression $\delta$ in the half bridge converter in the first prior art switching power supply apparatus. When the time periods from time $T_2$ to time $T_3$, from time $T_4$ to time $T_5$, from time $T_6$ to time $T_7$ and from time $T_8$ to time $T_9$ are taken into account in the above-mentioned equation (4), the output voltage $V_{OUT}$ decreases but a desired output voltage $V_{OUT}$ is obtainable by increasing the value of $\delta$. In the above-mentioned configuration, the electric charges, which are stored in the parasitic capacitances of the first to fourth switching elements 3, 5, 10 and 12 and a distributed capacitance of the transformer 9, are discharged immediately before turn-ON of the first to fourth switching elements 3, 5, 10 and 12. Consequently, surge currents generated by short-circuiting these parasitic capacitances and the distributed capacitance can be reduced, and generation of noise can be suppressed.

Moreover, power loss is reduced by decrease of the surge current, and therefore efficiency of the switching power supply apparatus is improved.

Additionally, surge voltages generated at turn-OFF of the first and second switching elements 3 and 5 which are caused by the leakage inductance of the transformer 9 are effectively absorbed by the first and second capacitors 7 and 8 and by the direct current source 1 by turn-ON of the third and fourth diodes 11 and 12 of the bidirectional switching unit 25. Consequently, generation of the surge voltages can be prevented.

Furthermore, surge voltages generated at turn-OFF of the third and fourth switching elements 10 and 12 in the bidirectional switching unit 25 are also absorbed by the first and second capacitors 7 and 8 and the direct current source 1 by turn-ON of the first and second diodes 4 and 6. Consequently, generation of the surge voltages are prevented.

The energy amount for charging to or discharging from the parasitic capacitances depends on the energy stored in the exciting inductance and the leakage inductance of the transformer 9. If the transformer 9 has a negligibly small leakage inductance, and the energy to charge to or discharge from the parasitic capacitances is insufficient, the leakage inductance can be intentionally increased by connecting an inductor element in series with the primary winding 9A or the secondary winding 9B of the transformer 9. Charging energy or discharging energy of the parasitic capacitances can be increased by the increase of the leakage inductance. On the other hand, discharge of the electric charges in the parasitic capacitances of the first and second switching units 34 and 56, and the distributed capacitance of the transformer 9 can be aided by decreasing the exciting inductance of the transformer 9 and reverse-exciting it.

Figure 2:
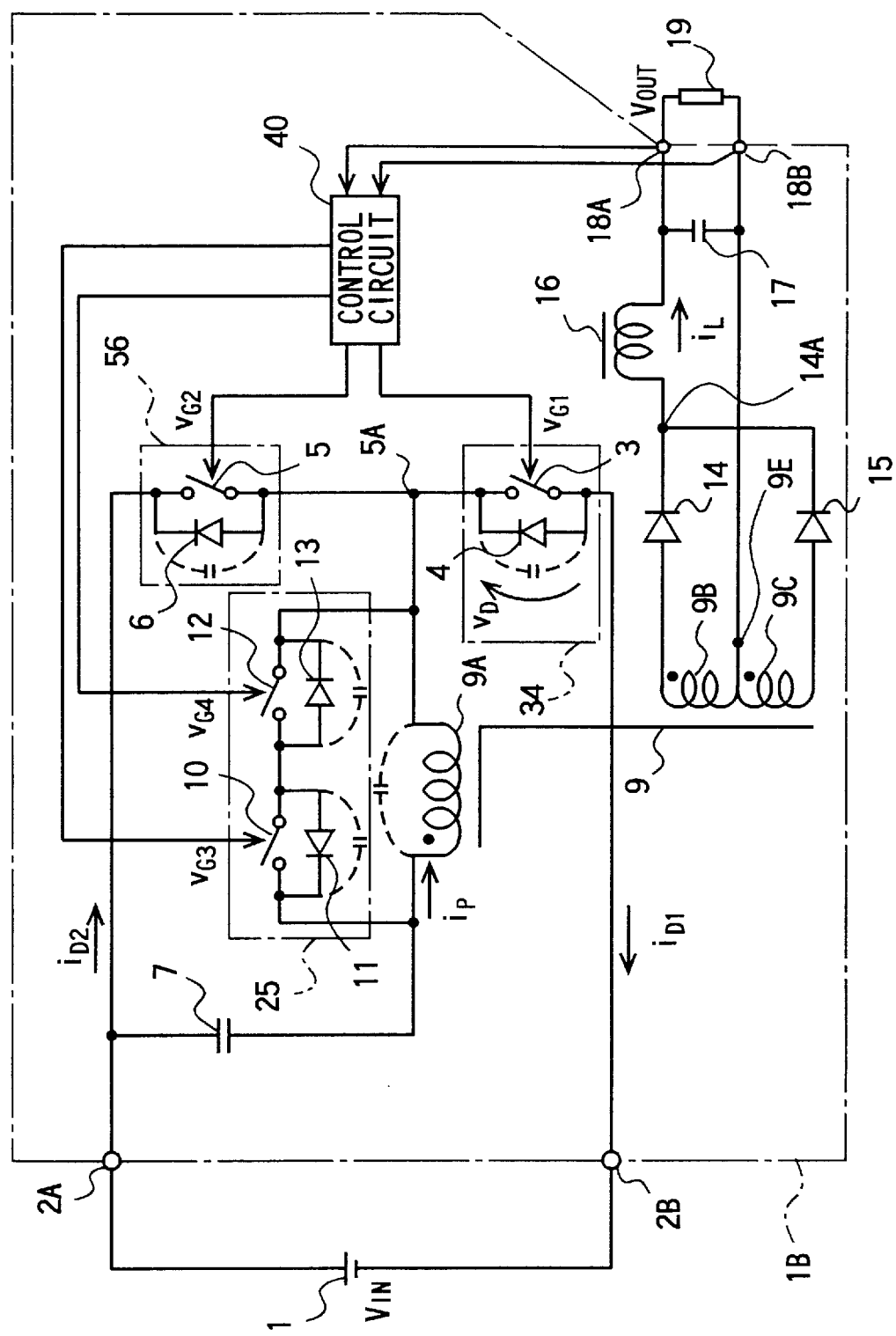
FIG. 2 is a circuit diagram of the switching power supply apparatus having only one capacitor 7 of the first embodiment of the present invention.
Figure 3:
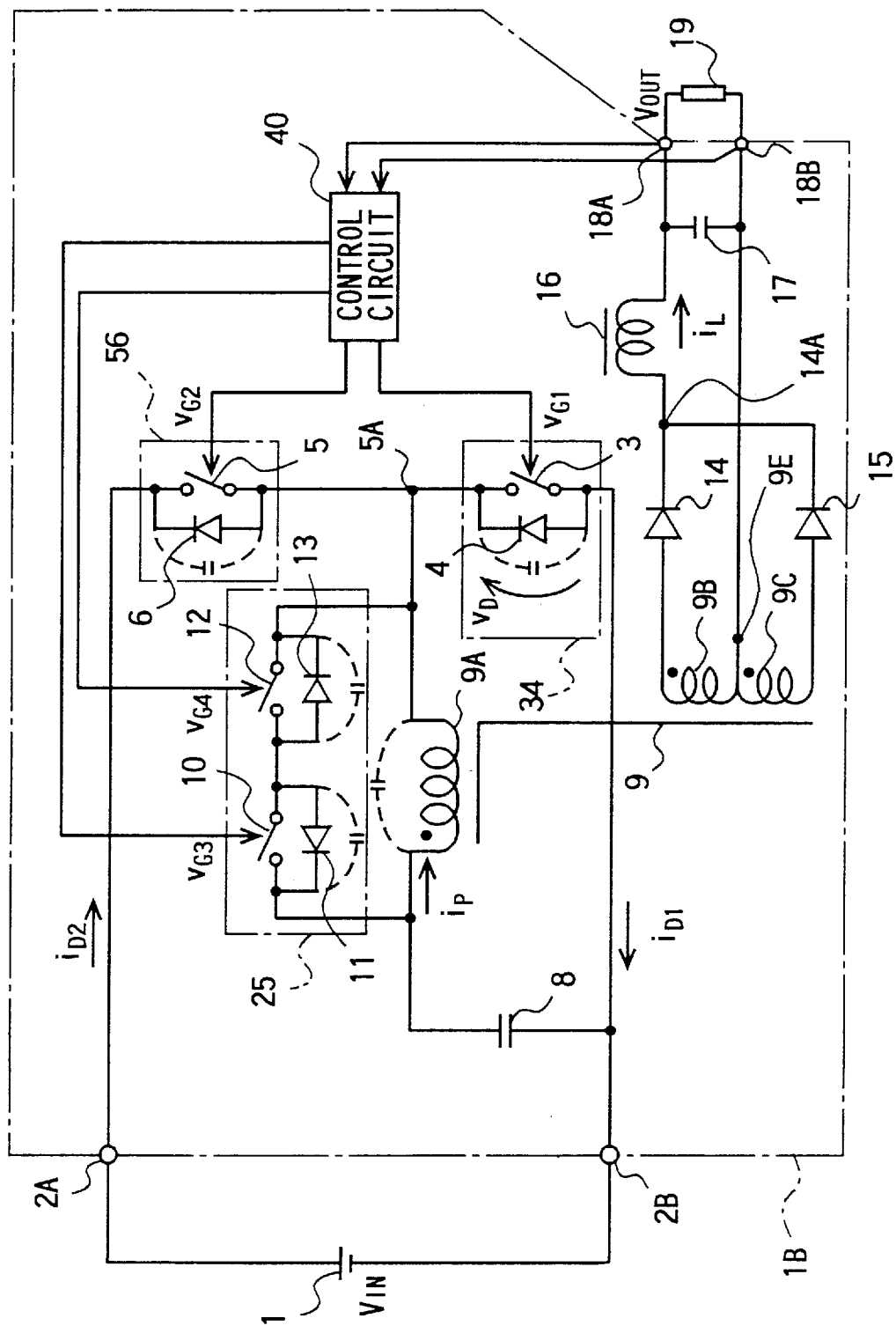
FIG. 3 is a circuit diagram of the switching power supply apparatus having only one capacitor 8 of the first embodiment of the present invention.

Other examples of the first embodiment are shown by FIG. 2 and FIG. 3.

In the configuration shown in FIG. 1, the input voltage $V_{IN}$ is divided by the serially-coupled pair of the first and second capacitors 7 and B. In the case that the first capacitor 7 is connected between the input terminal 2A and the primary winding 9A as shown in FIG. 2, or the second capacitor 8 is connected between the input terminal 2B and the primary winding 9A, as shown in FIG. 3, the switching power supply apparatus is also normally operated.

Furthermore, in the case that additional capacitors are added to the parasitic capacitances connected equivalently parallel with the first and second switching units 34 and 56, the bidirectional switching unit 25 and the transformer 9, the basic operation of the switching power supply apparatus is not influenced. The additional capacitors serve as snubber circuits, and a rise edge of current becomes gentle and generation of noise is further reduced. Furthermore, inclinations of rise edges of the voltages applied to the switching elements 3, 5, 10 and 12 at turn-OFF decrease and power loss in switching operation is further reduced. The voltage applied to each switching unit does not exceed the input voltage $V_{IN}$, and the transformer is not excited by a direct current in a similar manner to the prior art half bridge converter.

According to the first embodiment, the electric charges stored in the parasitic capacitances of the first to fourth switching elements 3, 5, 10 and 12 and the distributed capacitance of the transformer 9 are discharged immediately before turn-ON of these switching elements 3, 5, 10 and 12, and therefore the surge current is reduced. Consequently, generation of the noise is reduced and the power loss is also reduced. The efficiency of the switching power supply apparatus is improved. Moreover, a switching frequency of the switching elements can be increased because the generation of the noise is reduced. Consequently, the switching power supply apparatus of a high efficiency, low noise and a high switching frequency is realizable.

[Second embodiment]

Figure 5:
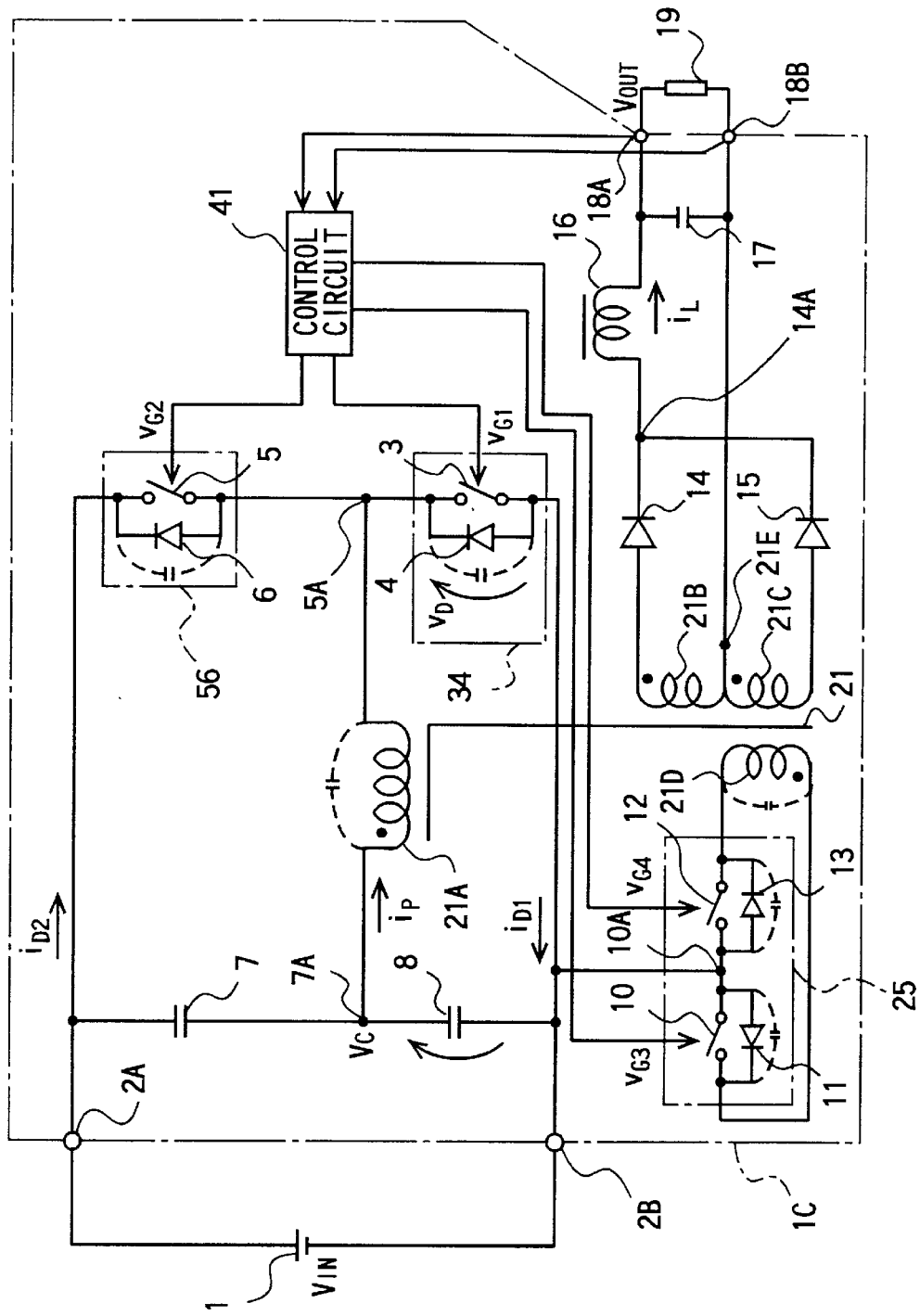
FIG. 5 is a circuit diagram of the switching power supply apparatus of a second embodiment of the present invention.

A second embodiment of the present invention is described with reference to FIG. 5 to FIG. 8. FIG. 5 is a circuit diagram of the switching power supply apparatus of the second embodiment.

Referring to FIG. 5, configurations of the direct current source 1, the first and second switching units 34 and 56, the first and second capacitors 7 and 8 and the bidirectional switching unit 25 are similar to these of the first embodiment, and therefore descriptions thereof are omitted.

A transformer 21 comprises a primary winding 21A, a first secondary winding 21B, a second secondary winding 21C and an auxiliary winding 21D. Turn ratio among the primary winding 21A, the first secondary winding 21B, the second secondary winding 21C and the auxiliary winding 21D is set to n:1:1:n (n: real number). The primary winding 21A is connected to the junction 7A between the first and second capacitors 7 and 8 at one end and connected to the junction 5A between the first and second switching units 34 and 56 at another end.

The anode of the first rectifying diode 14 is connected to one end of the first secondary winding 21B of the transformer 21. The anode of the second rectifying diode 15 is connected to one end of the second secondary winding 21C of the transformer 21. The cathodes of the first and second rectifying diodes 14 and 15 are connected in common.

The inductor element 16 is connected to the cathodes of the first and second rectifying diodes 14 and 15 at one end. Another end of the inductor element 16 is connected to one end of the smoothing capacitor 17. Another end of the smoothing capacitor 17 is connected to the junction 9E between the first and second secondary windings 21B and 21C. Voltages generated in the first and second secondary windings 21B and 21C are rectified by the first and second rectifying diodes 14 and 15 and smoothed by the inductor element 16 and the smoothing capacitor 17, and the output voltage $V_{OUT}$ is supplied to the load 19 through output terminals 18A and 18B.

The bidirectional switching unit 25 is connected across the auxiliary winding 21D.

The control circuit 41 detects the output voltage $V_{OUT}$ at the output terminals 18A and 18B, and generates control signals for controlling the first to fourth switching elements 3, 5, 10 and 12 by changing an ON-OFF ratio so that the output voltage $V_{OUT}$ becomes constant.

Figure 8:
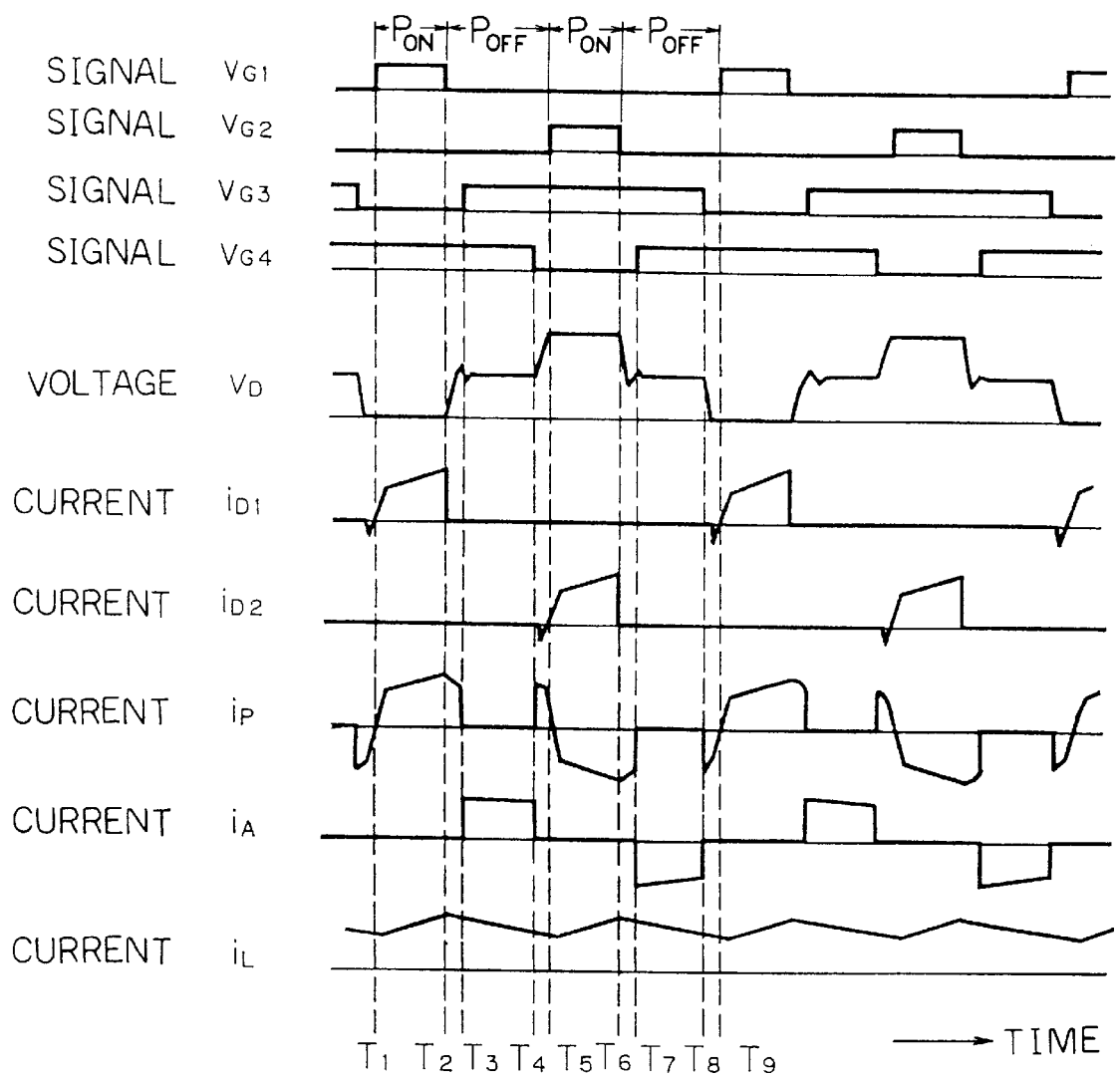
FIG. 8 is a waveform diagram of operation of the switching power supply apparatus of the second embodiment.

Operation of the switching power supply apparatus of the second embodiment is described hereafter with reference to FIG. 8.

Referring to FIG. 8, the driving pulse signal $V_{c1}$ is applied to the first switching element 3 from the control circuit 41. The driving pulse signal $VC_{c2}$ is applied to the second switching element 5 from the control circuit 41. The driving pulse signal $V_{c3}$ is applied to the third switching element 10 from the control circuit 41. The driving pulse signal $V_{c4}$ is applied to the fourth switching element 12 from the control circuit 41. Voltage $V_D$ is applied to the first switching unit 34. Current $i_{D1}$ passes through the first switching unit 34, and current $i_{D2}$ passes through the second switching unit 56. Current $i_P$ passes through the primary winding 21A. Current $i_A$ passes through the auxiliary winding 21D of the transformer 21. Current $i_L$ passes through the inductor element 16.

The first switching element 3 is turned ON by the driving pulse signal $V_{C1}$ of the control circuit 41 at time $T_1$, and the voltage $V_C$ is applied to the primary winding 21A of the transformer 21. A voltage $V_C/n$ is induced in the first secondary winding 21B of the transformer 21, and the rectifying diode 14 turns ON. A voltage $[V_C/n - V_{OUT}]$ is applied to the inductor element 16, and the current $i_L$ passing through the inductor element 16 linearly increases. The current $i_P$ of the primary winding 21A of the transformer 21 is the sum of an exciting current of the transformer 21 and a converted component current, which is the component such that the current passing through the first secondary winding 21B is converted into the current passing through the primary winding 21A, and therefore, linearly increases. Then, exciting energy is stored in the transformer 21 and the inductor element 16. At this time, the second and third switching elements 5 and 10 remain OFF and the fourth switching element 12 remains ON by the outputs of the control circuit 41, but the operation of circuit is not affected, because the second and third diodes 6 and 11 are reverse-biased and remain OFF.

When the driving pulse signal $V_{C1}$ of the control circuit 41 falls and the first switching element 3 turns OFF at time $T_2$, a leakage inductance of the transformer 21 causes the current $i_P$ of the primary winding 21A of the transformer 21 to flow continuously. Therefore, the current $i_P$ charges or discharges parasitic capacitances connected equivalently parallel with the first and second switching units 34 and 56 and the transformer 21. Consequently, the voltage $V_D$ applied to the first switching unit 34 increases and a voltage applied to the primary winding 21A of the transformer 21 decreases. Simultaneously, a voltage induced in the auxiliary winding 21D also decreases. When this voltage reaches zero, the third diode 11 is turned ON by a voltage applied through the fourth switching element 12 of ON-state, and the bidirectional switching unit 25 turns ON.

The third switching element 10 is turned ON by the driving pulse signal $G_{C3}$ of the control circuit 41 at time $T_3$. Even if an ON-current passes through the third diode 11 or through the third switching element 10, the operation does not change. An exciting energy stored in the transformer 21 is consumed to charge to or to discharge from the parasitic capacitances and thereby decreases. However, when the third diode 11 or the third switching element 10 turns ON, the auxiliary winding 21D of the transformer 21 is short-circuited by the bidirectional switching unit 25, and the exciting energy stored in the leakage inductance and the exciting inductance of the transformer 21 are held. Voltages induced in the first and second secondary windings 21B and 21C of the transformer 21 fall to zero, and the output voltage $V_{OUT}$ is applied to the inductor element 16. A secondary current of the transformer 11 is divided into a current passing through the first secondary winding 21B and a current passing through the second secondary winding 21C of the transformer 21 so as to hold continuously the exciting energy. Consequently, the first and second rectifying diodes 14 and 15 turn ON.

When the fourth switching element 12 turns OFF and the bidirectional switching unit 25 becomes nonconductive at time $T_4$, the parasitic capacitances connected equivalently parallel with the first and second switching units 34 and 56 and the transformer 21 are charged or discharged by the exciting energy stored in the transformer 21. Consequently, the voltage $V_D$ applied to the first switching unit 34 increases. When the voltage $V_D$ reaches the input voltage $V_{IN}$, the second diode 6 turns ON.

The second switching element 5 is turned ON by the driving pulse signal $V_{c2}$ of the control circuit 41 at time $T_5$. Even if the current $i_{D2}$ passes through the second diode 6 or the second switching element 5, the operation does not change.

When the second switching unit 56 turns ON, the voltage $[V_C - V_{IN}]$ is applied to the primary winding 21A of the transformer 21, and the current $i_P$ passing through the primary winding 21A rapidly decreases. When a sufficient inverse current is supplied to the primary winding 21A of the transformer 21, the first rectifying diode 14 turns OFF, and the voltage $[(V_{IN}-V_C)/n]$ is induced in the second secondary winding 21C. The voltage $[(V_{IN}-V_C)/n-V_{OUT}]$ is applied to the inductor element 16, and the current $i_L$ passing through the inductor element 16 linearly increases. The current $i_P$ of the primary winding 21A of the transformer 21 is the sum of an exciting current of the transformer 21 and a converted component current, which is the component such that a current passing through the secondary winding 21B is converted into the current passing through the primary winding 21A, and therefore, linearly decreases. Then, exciting energy is stored in the transformer 21 and the inductor element 16. At this time, even though the first switching element 3 remains OFF, the third switching element 10 remains ON and the fourth switching element 12 remains OFF by the outputs of the control circuit 41, the operation of circuit is not affected because the first and fourth diodes 6 and 13 are reverse-biased.

When the driving pulse signal $v_{C2}$ of the control circuit 41 falls and the second switching element 5 turns OFF at time $T_6$, the leakage inductance of the transformer 21 causes the current $i_P$ of the primary winding 21A to flow continuously. Therefore, the current $i_P$ charges or discharges the parasitic capacitances connected equivalently parallel with the first switching unit 34, the second switching unit 56 and the transformer 21. Consequently, the voltage $V_D$ applied to the first switching unit 34 and a voltage applied to the primary winding 21A of the transformer 21 decrease. Simultaneously, a voltage induced in the auxiliary winding 21d also decreases. When this voltage falls to zero, the fourth diode 13 is turned ON by a voltage applied through the third switching element 10 of ON-state, and the bidirectional switching unit 25 becomes conductive.

The fourth switching element 12 is turned ON by the driving pulse signal $v_{c4}$ of the control circuit 41 at time $T_7$. Even if an ON-current passes through the fourth diode 13 or through the fourth switching element 12, the operation does not change. Then, an exciting energy of negative polarity stored in the transformer 21 is consumed by charging to or discharging from the parasitic capacitances. Consequently, the current $i_P$ of the primary winding 21A once increases. When the fourth diode 13 or the fourth switching element 12 turns ON, the auxiliary winding 21D of the transformer 21 is short-circuited by the bidirectional switching unit 25, and the energy of negative polarity stored in the leakage inductance and the exciting inductance of the transformer 21 is held, Consequently, the voltages induced in the first secondary winding 21B and the second secondary winding 21C of the transformer 21 fall to zero, and the voltage $V_{OUT}$ is applied to the inductor element 16. A secondary current is divided into a current passing through the first secondary winding 21B and a current passing through the second secondary winding 21C of the transformer 21 so as to hold continuously the exciting energy, and therefore the first rectifying diode 14 and the second rectifying diode 15 turn ON.

When the third switching element 10 turns OFF and the bidirectional switching unit 25 becomes non-conductive at time $T_B$, the parasitic capacitances connected equivalently parallel with the first and second switching units 34 and 56 and the transformer 21 are charged or discharged by the energy held by the transformer 21, and the voltage $v_D$ applied to the first switching unit 34 decreases. When the voltage $V_D$ falls to zero, the first diode 4 turns ON.

The first switching element 3 is turned ON by the driving pulse signal $V_{C1}$ of the control circuit 41 at time $T_9$. Even if the current $i_{D1}$ passes through the first diode 4 or the first switching element 3, the operation does not change. The current $i_P$ passing through the primary winding 21A of the transformer 21 once increases to charge to or discharge from the parasitic capacitances. And when the first switching unit 34 turns ON, the voltage $V_C$ is applied to the primary winding 21A of the transformer 21, and the current $i_P$ of the primary winding 21A rapidly increases. When a sufficient current is supplied to the primary winding 21A and the transformer 21, the second rectifying diode 15 turns OFF. Since the voltage $v_C/n$ is induced in the first secondary winding 21B, the voltage $[(V_{IN}-V_C)/n-V_{OUT}]$ is applied to the inductor element 16. Then, the above-mentioned operation is repeated.

The ON-periods of the first switching unit 34 and the second switching unit 56 are selected to be equal each other, and are designated as $P_{ON}$. The OFF-period from turn-OFF of the first switching unit 34 to turn-ON of the second switching unit 56 is selected to be equal to the OFF-period from turn-OFF of the second switching unit 56 to turn-ON of the first switching unit 34, and is designated as $P_{OFF}$. When the ON-period and the OFF-period are selected as mentioned above, equation (5) is derived by the reset condition of the transformer 21.

$$(V_{IN}-V_C) \times P_{ON} = V_C \times P_{ON} \qquad (5)$$

When time periods from $T_2$ to $T_3$, from $T_4$ to $T_5$, from $T_6$ to $T_7$ and from $T_B$ to $T_9$ are negligibly short and disregarded, equation (6) is derived by the reset condition of the inductor element 16.

$$[(V_{IN}-V_C)/N-V_{OUT}] \times P_{ON} = V_{OUT} \times P_{OFF} \qquad (6)$$

Therefore, from equation (6), $V_C$ and $V_{OUT}$ are represented as follows:

$V_C = V_{IN}/2$, and $V_{OUT} \delta V_{IN}/2n$, where, $\delta = P_{ON}/(P_{ON}+P_{OFF})$.

Therefore, the direct current output voltage $V_{OUT}$ can be controlled by changing the ON-OFF ratio $P_{ON}/P_{OFF}$ of the first switching element 3 and the second switching element 5. When the time periods from $T_2$ to $T_3$, from $T_4$ to $T_5$, from $T_6$ to $T_7$ and from $T_8$ to $T_9$ are taken into account, the direct current output voltage $V_{OUT}$ decreases. However, a desired direct current output voltage $V_{OUT}$ is attainable by increasing the value of δ corresponding to the decrease of the direct current output voltage $V_{OUT}$.

In the second embodiment, the electric charges stored in the parasitic capacitances and a distributed capacitance of the transformer 21 are discharged immediately before turn-ON of the first, second, third and fourth switching elements 3, 5, 10 and 12, and these switching elements turn ON after the discharge. Therefore, generation of a surge current due to short circuit can be reduced, and generation of noise can be suppressed. A power loss due to the surge current decreases, and efficiency is improved. Surge voltages at turn-OFF of the first and second switching elements 3 and 5 caused by the leakage inductance of the transformer 21 are effectively absorbed into the first and second capacitors 7 and 8 and the direct current power source 1 by turn-ON of the third and fourth diodes 11 and 12 of the bidirectional switching unit 25. Consequently, the surge voltage is not generated. Furthermore, surge voltages generated at turn-OFF of the third and fourth switching elements 10 and 12 of the bidirectional switching unit 25 are also absorbed into the first and second capacitors 7 and 8 and the direct current power source 1 by turn-ON of the first and second diodes 4 and 6. Therefore, the surge voltages are not generated.

Energy of charging to and discharging from the parasitic capacitances depends on the energy stored in the exciting inductance and the leakage inductance of the transformer 21. The leakage inductance can be intentionally increased by connecting an inductor element in series with the primary winding 21A or the secondary winding 21B of the transformer 21. Discharge energy of the parasitic capacitances can be increased by the increase of the leakage inductance. Moreover discharge of the parasitic capacitances of the first and second switching units 34 and 56 and the distributed capacitance of the transformer 21 can be aided by decreasing the exciting inductance of the transformer 21 and reverse-exciting the transformer 21.

Figure 6:
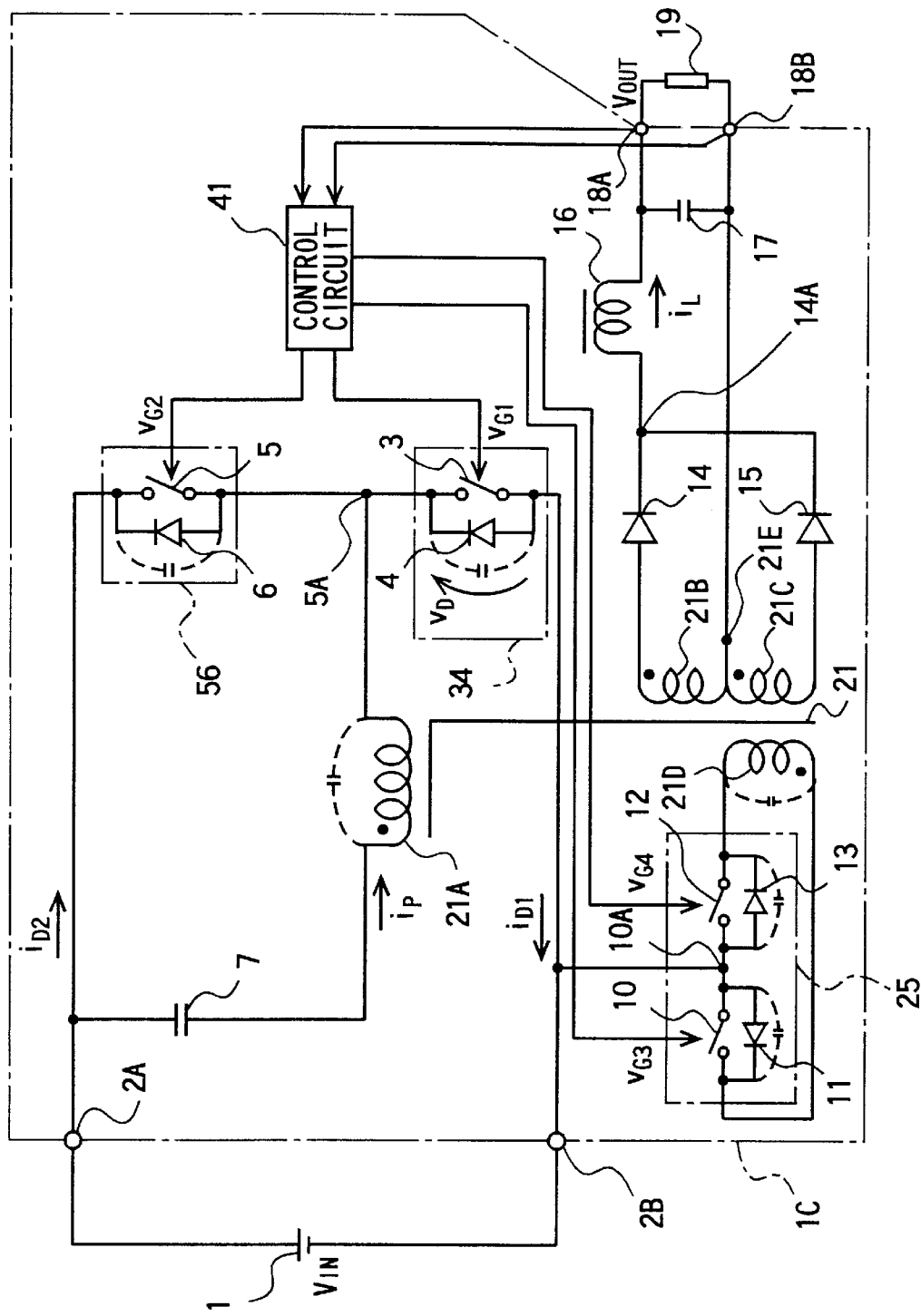
FIG. 6 is a circuit diagram of the switching power supply apparatus having only one capacitor 7 of the second embodiment of the present invention.
Figure 7:
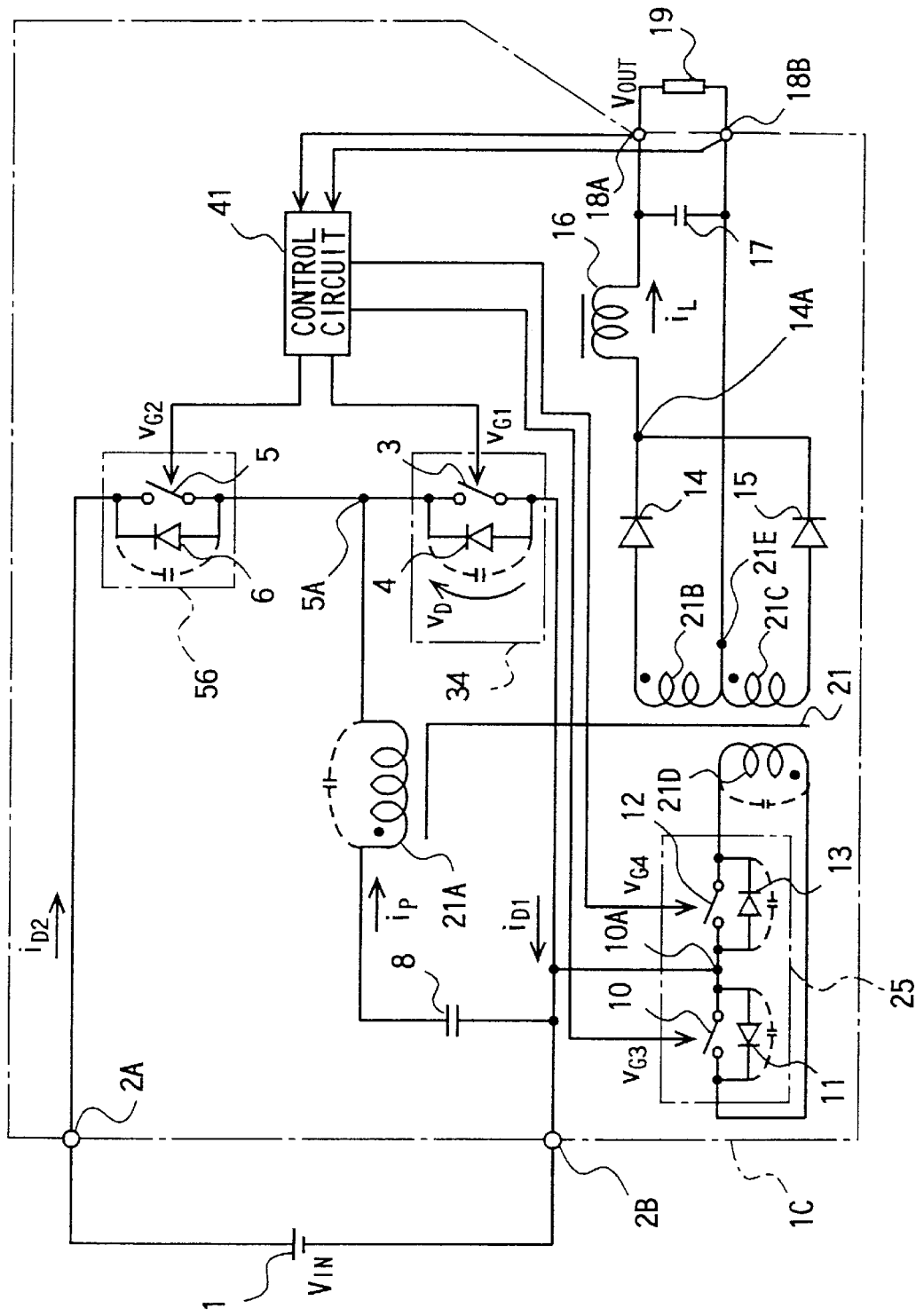
FIG. 7 is a circuit diagram of the switching power supply apparatus having only one capacitor 8 of the second embodiment of the present invention.

Other examples of the second embodiment are shown by FIG. 6 and FIG. 7.

In the configuration of FIG. 5, the voltage $V_{IN}$ is divided by the serially-coupled pair of the first capacitor 7 and the second capacitor 8. In the case that the first capacitor 7 is connected between the input terminal 2A and the primary winding 21A as shown in FIG. 6, or that the second capacitor 8 is connected between the input terminal 2B and the primary winding 21A as shown in FIG. 7, the switching power supply apparatus is also normally operated.

In the configuration as shown in FIG. 5, the junction 10A between the third switching element 10 and the fourth switching element 12 of the bidirectional switching unit 25 is connected to the negative input terminal 2B (circuit ground) of the direct current source 1. Therefore, levels of the driving pulse signals $v_{c3}$ and $v_{c4}$ of the control circuit 41 can be flexibly selected. Consequently, the configuration of the control circuit 41 is simplified In the configuration as shown in FIG. 5, if capacitors are added to the parasitic capacitances connected equivalently parallel with the first and second switching units 34 and 56, the bidirectional switching unit 25 and the transformer 21, the basic operation of the switching power supply apparatus is not influenced. Inclination of a rise edge of the voltage applied to each switching element at turn-OFF decreases by addition of these capacitors, and a power loss generated by switching operation can be further decreased. The voltages applied to the first and second switching units 34 and 56 do not decrease by addition of these capacitors. The maximum voltages applied to the first and second switching units 34 and 56 are the input voltage $V_{IN}$, and the feature that the transformer 21 is not excited by a direct current is maintained, and the switching power supply apparatus having a high efficiency, low noise and a high switching frequency is realizable.

[Third embodiment]

Figure 9:
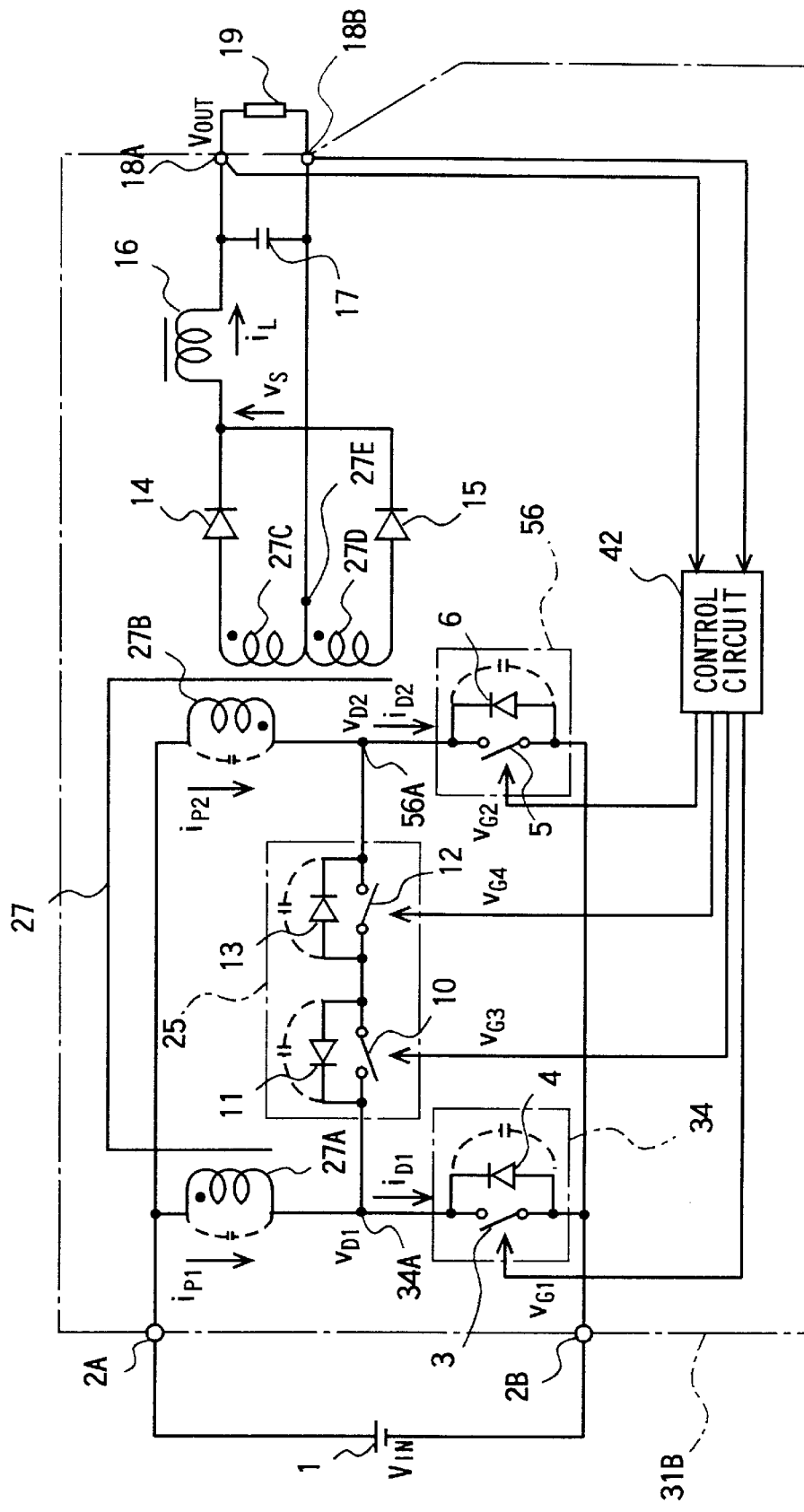
FIG. 9 is a circuit diagram of the switching power supply apparatus in a third embodiment of the present invention.
Figure 10:
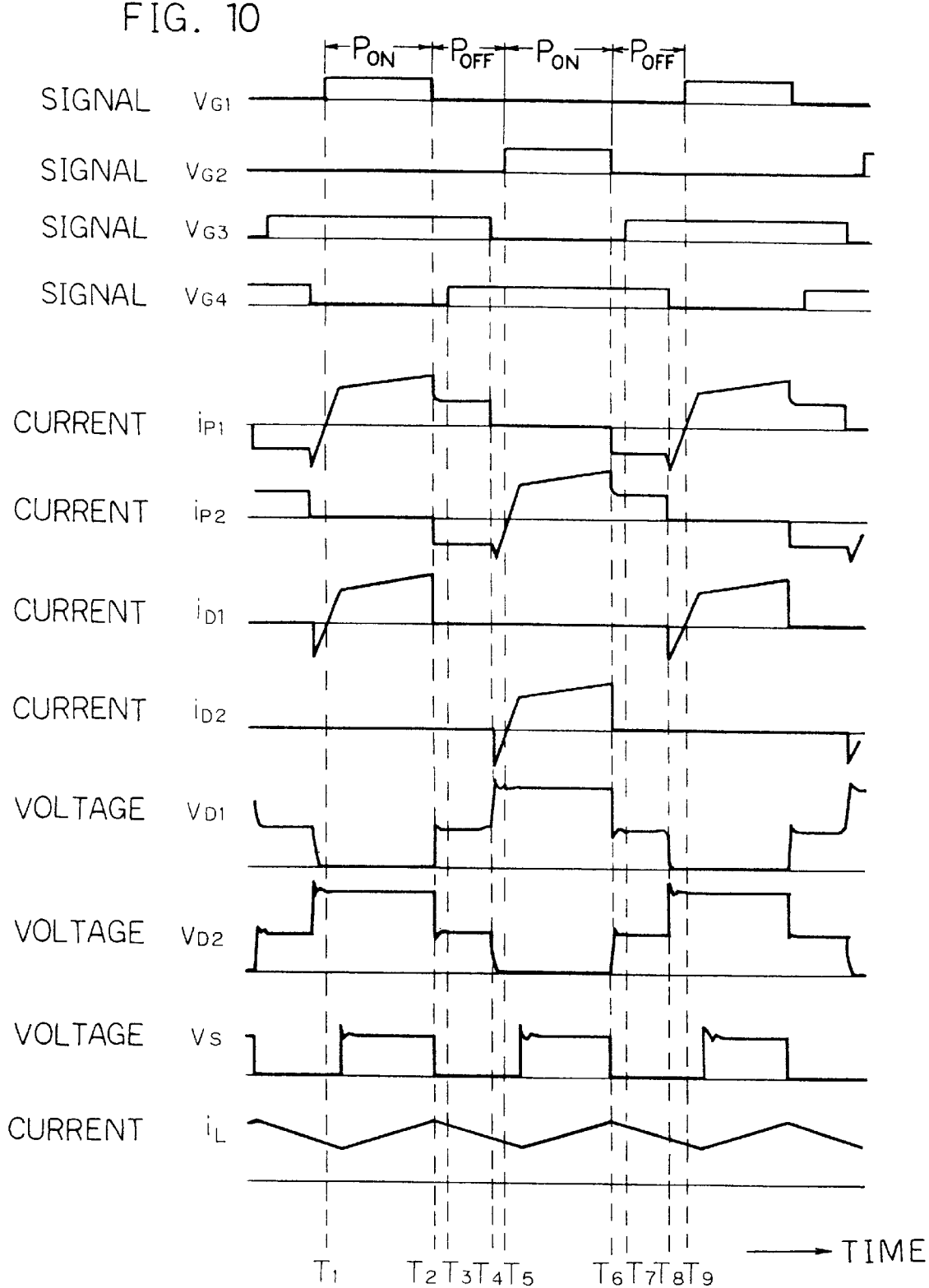
FIG. 10 is a waveform diagram of operation in the third embodiment.

A third embodiment of the present invention is described hereafter with reference to FIG. 9 and FIG. 10. FIG. 9 is a circuit diagram of a switching power supply apparatus 31B of the third embodiment. Referring to FIG. 9, elements similar to the elements in FIG. 1 are designated as like reference numerals, and the descriptions thereof are is omitted.

The input terminals 2A and 2B of the switching power supply apparatus 31B is connected to the direct current power source 1. The first and second switching units 34 and 56 and the bidirectional switching unit 25 are similar to those in FIG. 1. A transformer 27 comprises a first primary winding 27A, a second primary winding 27B, a first secondary winding 27C and a second secondary winding 27D. Turn ratio among the first primary winding 27A, the second primary winding 27B, the first secondary winding 27C and the second secondary winding 27D is set to n:n:1:1. A serially-coupled pair of the first primary winding 27A and the first switching unit 34 is connected across the input terminals 2A and 2B. A serially-coupled pair of the second primary winding 27B and the second switching unit 56 is also connected across the input terminals 2A and 2B. The first primary winding 27A and the second primary winding 27B of the transformer 27 are close-coupled in order to smoothly commutate currents in these windings.

The bidirectional switching unit 25 is connected between the junction 34A of the first primary winding 27A and the first switching unit 34 and the junction 56A of the second primary winding 27B and the second switching unit 56. The anode of the first rectifying diode 14 is connected to one end of the first secondary winding 27C of the transformer 27. The anode of the second rectifying diode 15 is connected to one end of the second secondary winding 27D of the transformer 27. The cathodes of the first rectifying diode 14 and the second rectifying diode 15 are connected in common. The inductor element 16 is connected in series with the smoothing capacitor 17 at one end and an another end of the inductor element 16 is connected to the cathodes of the first rectifying diode 14 and the second rectifying diode 15. The other end of the smoothing capacitor 17 is connected to the junction 27E between the first secondary winding 27C and the second secondary winding 27D. Voltages induced in the first and second secondary windings 27C and 27D of the transformer 27 are rectified by the first and second rectifying diodes 14 and 15 and smoothed by the inductor element 16 and the smoothing capacitor 17 and output to the output terminals 18A and 18B. The load 19 is connected across the output terminals 18A and 18B.

A control circuit 42 detects an output voltage $V_{OUT}$ at the output terminals 18A and 18B and generates control signals controlling ON-OFF ratios of the first switching element 3, the second switching element 5, the third switching element 10 and the fourth switching element 12 so that the output voltage $V_{OUT}$ becomes constant.

Operation of the switching power supply apparatus configured above is described hereafter with reference to waveform diagrams in FIG. 10. Referring to FIG. 10, the driving pulse signal $v_{C1}$ is applied to the first switching element 3 from the control, circuit 42. The driving pulse signal $v_{c2}$ is applied to the second switching element 5 from the control circuit 42. The driving pulse signal $v_{c3}$ is applied to the third switching element 10 from the control circuit 42. The driving pulse signal $V_{c4}$ is applied to the fourth switching element 12 from the control circuit 42. Current $i_{P1}$ passes through the first primary winding 27A of the transformer 27. Current $i_{P2}$ passes through the second primary winding 27B of the transformer 27. Current $i_{D1}$ passes through the first switching unit 34. Current $i_{D2}$ passes through the second switching unit 56. Voltage $v_{D1}$ is applied to the first switching unit 34. Voltage $V_{D2}$ is applied to the second switching unit 56. Voltage $v_S$ is applied across the cathodes of the rectifying diodes 14 and 15 and the junction 27E. Current $i_L$ passes through the inductor element 16.

When the first switching element 3 is turned ON by input of the driving pulse signal $v_{C1}$ from the control circuit 42 at time $T_1$, the input voltage $V_{IN}$ is applied to the primary winding 27A of the transformer 27. The voltage $V_{IN}/n$ is induced in the first secondary winding 27C of the transformer 27, and the rectifying diode 14 turns ON. The voltage $[V_{IN}/n - V_{OUT}]$ is applied to the -inductor element 16, and the current $i_L$ passing through the inductor element 16 linearly increases. The current $i_{P1}$ of the first primary winding 27A of the transformer 27 is the sum of an exciting current of the transformer 27 and a converted component current, which is the component such that the current passing through the first secondary winding 27C is converted into the current in the first primary winding 27A, and therefore, linearly increases. Exciting energy is stored in the transformer 27 and the inductor element 16. At this time, though the second switching element 5 remains OFF, the third switching element 10 remains ON and the fourth switching element 12 remains OFF by control of the control circuit 42, operation of the circuit is not affected because the second diode 6 and the fourth diode 13 are reverse-biased and remain OFF.

When the driving pulse signal $v_{C1}$ of the control circuit 42 falls and the first switching element 3 turns OFF at time $T_2$, the leakage inductance of the transformer 27 causes the current $i_{D1}$ passing through the first switching element 3 to flow continuously, and therefore the current $i_{D1}$ charges or discharges the parasitic capacitances connected equivalently parallel with the first switching unit 34, the second switching unit 56 and the transformer 27. Consequently, the voltage $v_{D1}$ applied to the first switching unit 34 increases, and the voltage $V_{D2}$ applied to the second switching unit 56 decreases. When the voltage $v_{D1}$ increases and reaches the voltage $V_{IN}$, the voltage applied to the first primary winding 27A and the second primary winding 27B of the transformer 27 fall to zero. Consequently, the fourth diode 13 is turned ON by a voltage applied through the third switching element 10 of ON-state, and the bidirectional switching unit 25 becomes conductive. The fourth switching element 12 is turned ON by the driving pulse signal $v_{C4}$ of the control circuit 42 at time $T_3$ in the period of ON-state of the fourth diode 4. Even if an ON-current passes through the fourth diode 13 or through the fourth switching element 12, the operation of the circuit does not change.

When the bidirectional switching unit 25 becomes conductive, the serially-coupled pair of the first primary winding 27A and the second primary winding 27B of the transformer 27 is short-circuited and the energy stored in the leakage inductance and the exciting inductance of the transformer 27 is held. Since the first primary winding 27A is connected in series with the second primary winding 27B by the bidirectional switching unit 25, the number of turns of the primary windings is equivalently doubled. Consequently, the current $i_{P1}$ passing through the first primary winding 27A of the transformer 27 reduces by half.

By the above-mentioned operation, the voltages induced in the first secondary winding 27C and the second secondary winding 27D of the transformer 27 fall to zero, and the voltage $V_{OUT}$ is applied to the inductor element 16. A secondary current of the transformer 27 is divided into a current passing through the first secondary winding 27C and a current passing through the second secondary winding 27D so that the exciting energy is continuously held. Therefore, the first rectifying diode 14 and the second rectifying diode 15 turn ON.

When the bidirectional switching unit 25 becomes non-conductive by turn-OFF of the third switching element 10 at time $T_4$, the parasitic capacitances connected equivalently parallel with the first switching unit 34, the second switching unit 56 and the transformer 27 are charged or discharged by the energy held in the transformer 27. The voltage $v_{D1}$ applied to the first switching unit 34 increases, and the voltage $v_{D2}$ applied to the second switching unit 56 decreases. When the voltage $V_{D2}$ decreases and falls to zero, the second diode turns ON. During the ON-period of the second diode 6, the second switching element 5 is turned ON by the driving pulse signal $V_{C2}$ of the control circuit 42 at time $T_5$. Even if the ON-current $i_{D2}$ passes through the second diode 6 or through the second switching element 5, the operation of the circuit does not change.

When the second switching unit 56 turns ON, the input voltage $V_{IN}$ is applied to the second primary winding 27B of the transformer 27, and the current $i_{P2}$ passing through the second primary winding 27B rapidly increases. When a sufficient current is supplied to the second secondary winding 27D of the transformer 27, the first rectifying diode 14 turns OFF and the voltage $V_{IN}/n$ is induced in the second secondary winding 27D. Consequently, the voltage $[V_{IN}/n - V_{OUT}]$ is applied to the inductor element 16, and the current $i_L$ passing through the inductor element 16 linearly increases. The current $i_{P2}$ of the second primary winding 27B of the transformer 27 is the sum of an exciting current of the transformer 27 and a converted component current, which is the component such that the current passing through the first secondary winding 27C is converted into the current in the primary winding, and therefore, linearly increases. Consequently, exciting energy is stored in the transformer 27 and the inductor element 16. At this time, even though the first switching element 3 remains OFF, the third switching element 10 remains OFF and the fourth switching element 12 remains ON by the control circuit 42, the operation of the circuit is not affected, because the first diode 4 and the third diode 11 are reverse-biased and remain OFF.

When the driving pulse signal $V_{C2}$ of the control circuit 42 falls and the second switching element 5 turns OFF at time $T_6$, the leakage inductance causes the current $i_{D2}$ passing through the second switching element 5 to flow continuously, and therefore the current $i_{D2}$ charges or discharges the parasitic capacitances connected equivalently parallel with the first switching unit 34, the second switching unit 56 and the transformer 27. Consequently, the voltage $V_{D2}$ applied to the second switching unit increases, and the voltage $v_{D1}$ applied to the first switching unit 34 decreases. When the voltage $V_{D2}$ reaches the input voltage $V_{IN}$, the voltages applied to the first primary winding 27A and the second primary winding 27B of the transformer 27 fall to zero. The third diode 11 is turned ON by a voltage applied through the fourth switching element 10 of ON-state, and the bidirectional switching unit 25 becomes conductive. In the ON-period of the third diode 11, the third switching unit 10 is turned ON by the driving pulse signal $v_{C3}$ of the control circuit 42 at time $T_7$. Even if an ON-current passes through the third diode 11 or through the fourth switching element 12 either, the operation of the circuit does not change.

When the bidirectional switching unit 25 becomes conductive, the first primary winding 27A is connected in series with the second primary winding 27B of the transformer 27, and the energy stored in the leakage inductance and the exciting inductance of the transformer 27 is held. Since the first primary winding 27A is connected in series with the second primary winding 27B by the bidirectional switching unit 25, the number of turns of the primary windings is equivalently doubled. Consequently, the current $i_{P1}$ of the first primary winding 27A reduces by half.

By the above-mentioned operation, the voltages induced in the first secondary winding 27C and the second secondary winding 27D of the transformer 27 fall to zero and the voltage $V_{OUT}$ is applied to the inductor element 16. A secondary current is divided into a current passing through the first secondary winding 27C and a current passing through the second secondary winding 27D of the transformer 27 so that the exciting energy is held continuously. Consequently, the first rectifying diode 14 and the second rectifying diode 15 turn ON.

When the fourth switching unit turns OFF and the bidirectional switching unit 25 becomes non-conductive at time $T_8$, the parasitic capacitances connected equivalently parallel with the first switching unit 34, the second switching unit 56 and the transformer 27 are charged or discharged by the energy held in the transformer 27. When the voltage $V_{D1}$ applied to the first switching element 3 decreases and falls to zero, the first diode 4 turns ON. In the ON-period of the first diode 4, the first switching element 3 is turned ON by the driving pulse signal $v_{C1}$ of the control circuit 42. Even if the ON-current $i_{D1}$, passes through the first diode 4 or through the first switching element 3, the operation of the circuit does not change.

The current $i_{P1}$ passing through the first primary winding 27A of the transformer 27 is once decreased to charge to or discharge from the parasitic capacitances, but when the first switching unit 34 turns ON, the input voltage $V_{IN}$ is applied to the first primary winding 27A of the transformer 27A, and the current $i_{P1}$ of the first primary winding 27A rapidly increases. When a sufficient current is supplied to the first secondary winding 27C of the transformer 27, the second rectifying diode 15 turns OFF, and the voltage $V_{IN}/n$ is induced in the first secondary winding 27C. Consequently, the voltage $[V_{IN}/n - V_{OUT}]$ is applied to the inductor element 16. Then, the above-mentioned operation is repeated.

The ON-period of the first switching unit 34 is selected to be equal to that of the second switching unit 56, and is designated as $P_{ON}$. The OFF-period from turn-OFF of the first switching unit 34 to turn-ON of the second switching unit 56 is selected to be equal to the OFF-period from turn-OFF of the second switching unit 56 to turn-ON of the first switching unit 34, and is designated as $P_{OFF}$. When time periods from $T_2$ to $T_3$, from $T_4$ to $T_5$, from $T_6$ to $T_7$ and from $T_8$ to $T_9$ are negligibly short and disregarded, equation (8) is derived from the reset condition of the inductor element 16.

$$2(V_{IN}/n - V_{OUT}) \times P_{ON} = 2V_{OUT} \times P_{OFF} \qquad (8)$$

Therefore, from equation (8), $V_{OUT}$ is represented as follows:

$V_{OUT} = \delta V_{IN}/n$, where, $\delta = P_{ON}/(P_{ON} + P_{OFF})$.

Therefore, the output voltage $V_{OUT}$ can be controlled by adjusting the ON-OFF ratio ($P_{ON}/P_{OFF}$) of the first switching element 3 and the second switching element 5. When the time periods from $T_2$ to $T_3$, from $T_4$ to $T_5$, from $T_6$ to $T_7$ and from $T_8$ to $T_9$ are taken into account, the output voltage $V_{OUT}$ decreases, but a desired voltage can be attained by increasing the value of $\delta$ corresponding to the decrease of the output voltage $V_{OUT}$.

In the third embodiment, the electric charges of the parasitic capacitances of the first, second, third and fourth switching elements 3, 5, 10 and 12 and the distributed capacitance of the transformer 27 are discharged immediately before turn-ON of these switching elements 3, 5, 10 and 12. Consequently, generation of a current of spiky waveform due to short circuit can be reduced, and efficiency is improved and generation of noise is suppressed. Moreover, voltages of spiky waveforms at turn-OFF of the first and second switching elements 3 and 5 caused by the leakage inductance of the transformer 27 are effectively absorbed through the transformer 27 by turn-ON of the third diode 11 and the forth diode 13 of the bidirectional switching unit 25. Therefore, generation of the voltage of spiky waveform decreases. Surge voltages generated at turn-OFF of the third switching element 10 and the fourth switching element 12 of the bidirectional switching unit 25 are absorbed into the direct current source 1 through the transformer 27 by turn-ON of the first diode 4 and the second diode 6, and therefore generation of the surge voltages are prevented.

Energy of discharging from the parasitic capacitances of the first and second switching units 34 and 56 and the distributed capacitance of the transformer 27 immediately before turn-ON of the first switching unit 34 depends on the energy stored in the exciting inductance and the leakage inductance of the transformer 27 The energy of discharging can be increased by connecting inductor elements in series with the first secondary winding 27C and the second secondary winding 27D of the transformer 27. On the other hand, discharge of the parasitic capacitances of the first and second switching units 34 and 56 and the distributed capacitance of the transformer 27 can be aided by decreasing the value of inductance of the transformer 27 and reverse-exciting it.

If additional capacitors are connected to the parasitic capacitances connected equivalently parallel with the first switching unit 34, the second switching unit 56, the bidirectional switching unit 25 and the transformer 27, then a basic operation of the switching power supply apparatus is not affected. Inclinations of rise edges of the voltages applied to the switching units 34 and 56 at turn-OFF are decreased by the additional capacitors, and a power loss in switching operation can be further decreased. Consequently, the switching power supply apparatus having a high efficiency, low noise and a high switching frequency is realizable.

[Fourth embodiment]

Figure 11:
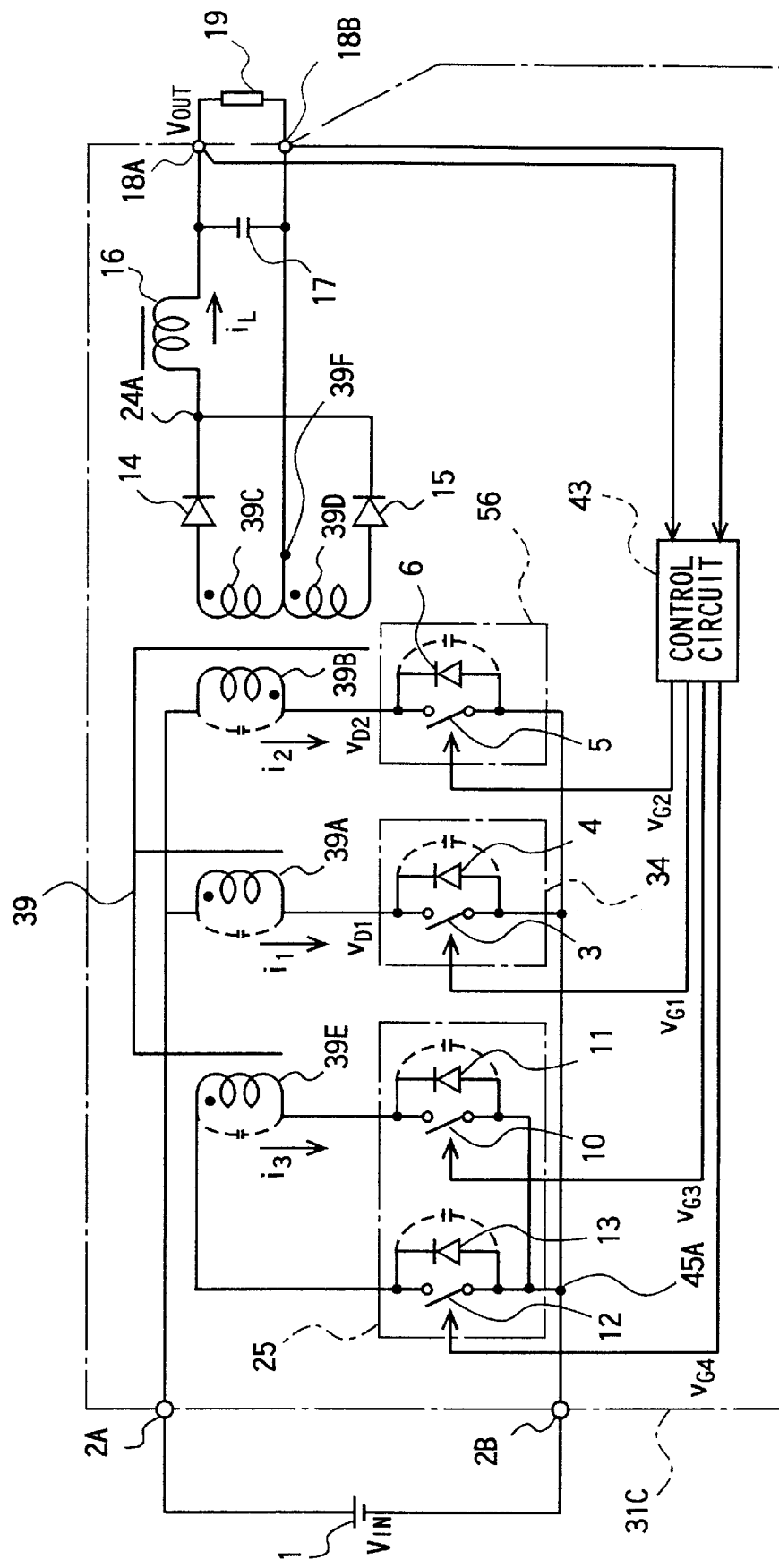
FIG. 11 is a circuit diagram of the switching power supply apparatus in a fourth embodiment of the present invention.

A fourth embodiment of the present invention is described with reference to FIG. 11 and FIG. 12. FIG. 11 is a circuit diagram of the switching power supply apparatus of the fourth embodiment. Referring to FIG. 11, elements similar to the elements of FIG. 9 are identified by like reference numerals, and the descriptions thereof are omitted.

A transformer 39 comprises a first primary winding 39A, a second primary winding 39B, a first secondary winding 39C, a second secondary winding 39D and an auxiliary winding 39E. Turn ratio among the first primary winding 39A, the second primary winding 39B, the first secondary winding 39C, the second secondary winding 39D and the auxiliary winding 39E is set to n:n:1:1:n. A serially-coupled pair of the first primary winding 39A and the first switching unit 34 is connected across the input terminals 2A and 2B. A serially-coupled pair of the primary winding 39B and the second switching unit 56 is also connected across the input terminals 2A and 2B. The first switching element 3 and the second switching element 5 alternately turn-ON and turn-OFF. The first primary winding 39A, the second primary winding 39B and the auxiliary winding 39E of the transformer 39 are close-coupled in order to smoothly commutate currents in these windings.

The anode of the first rectifying diode 14 is connected to one end of the first secondary winding 39C of the transformer 39. The anode of the second rectifying diode 15 is connected to one end of the second secondary winding 39D of the transformer 39. The cathodes of the first and second rectifying diodes 14 and 15 are connected in common. The inductor element 16 is connected in series with the smoothing capacitor 17, and the end of the inductor element 16 is connected to the junction 24A between the cathodes of the first and second rectifying diodes 14 and 15. The end of smoothing capacitor 17 is connected to the junction 39F between the first secondary winding 39C and the second secondary winding 39D. Voltages induced in the first and second secondary windings 39C and 39D of the transformer 39 are rectified and smoothed, and the output voltage $V_{OUT}$ is output to the output terminals 18A and 18B. The load 19 is connected across the output terminals 18A and 18B.

The bidirectional switching unit 25 has the same configuration as that of the second embodiment in FIG. 5. The bidirectional switching unit 25 is connected in parallel with the auxiliary winding 39E of the transformer 39. The junction 45A of the third and fourth switching elements 10 and 12 is connected to the negative terminal 2B (circuit ground) of the direct current source 1. The control circuit 43 detects an output voltage $V_{OUT}$ of the output terminals 2A and 2B, and generates control signals of the first to the fourth switching elements 3, 5, 10 and 12 so that the output voltage $V_{OUT}$ becomes constant.

Figure 12:
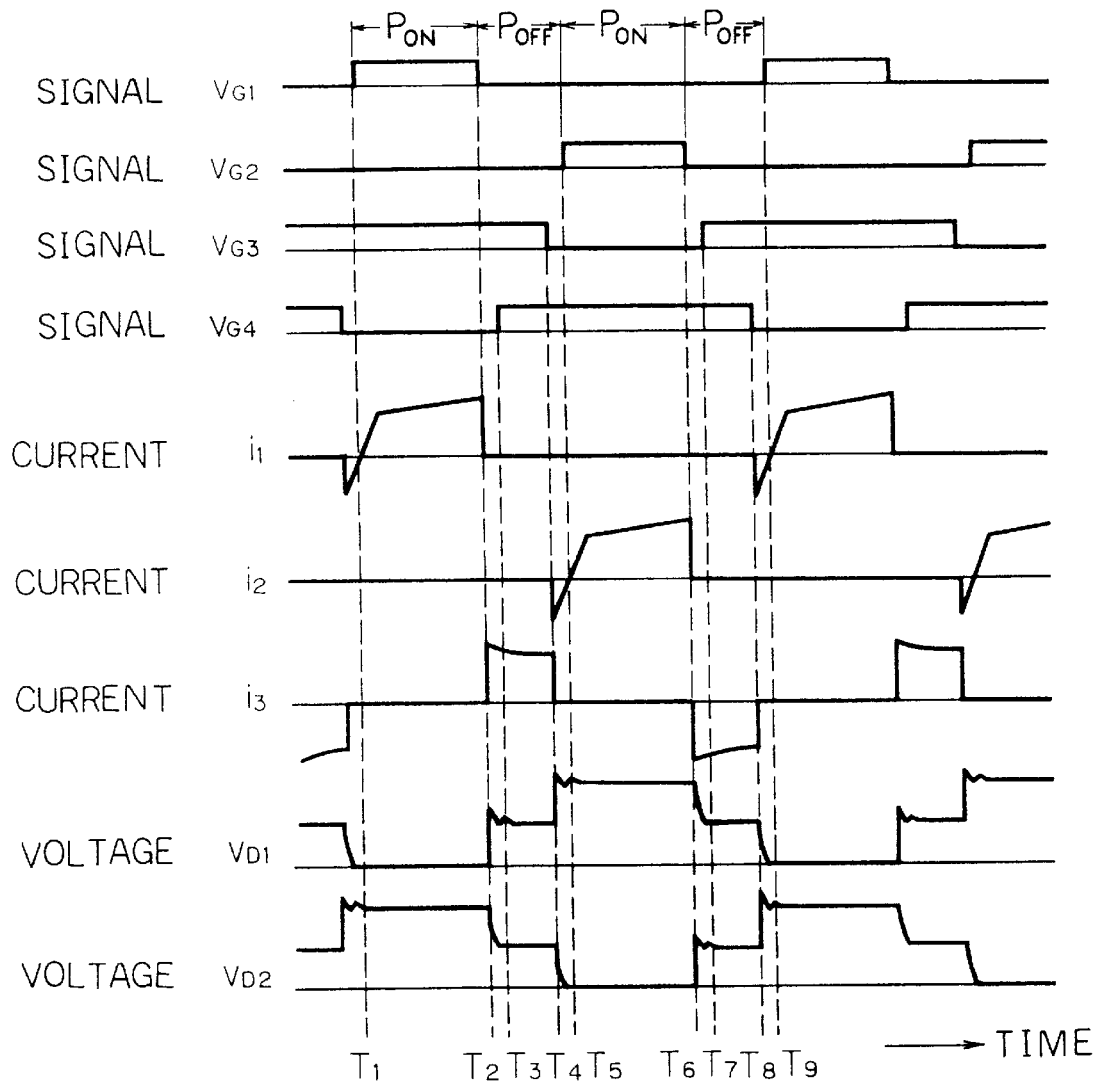
FIG. 12 is a waveform diagram of operation in the fourth embodiment.
Figure 13:
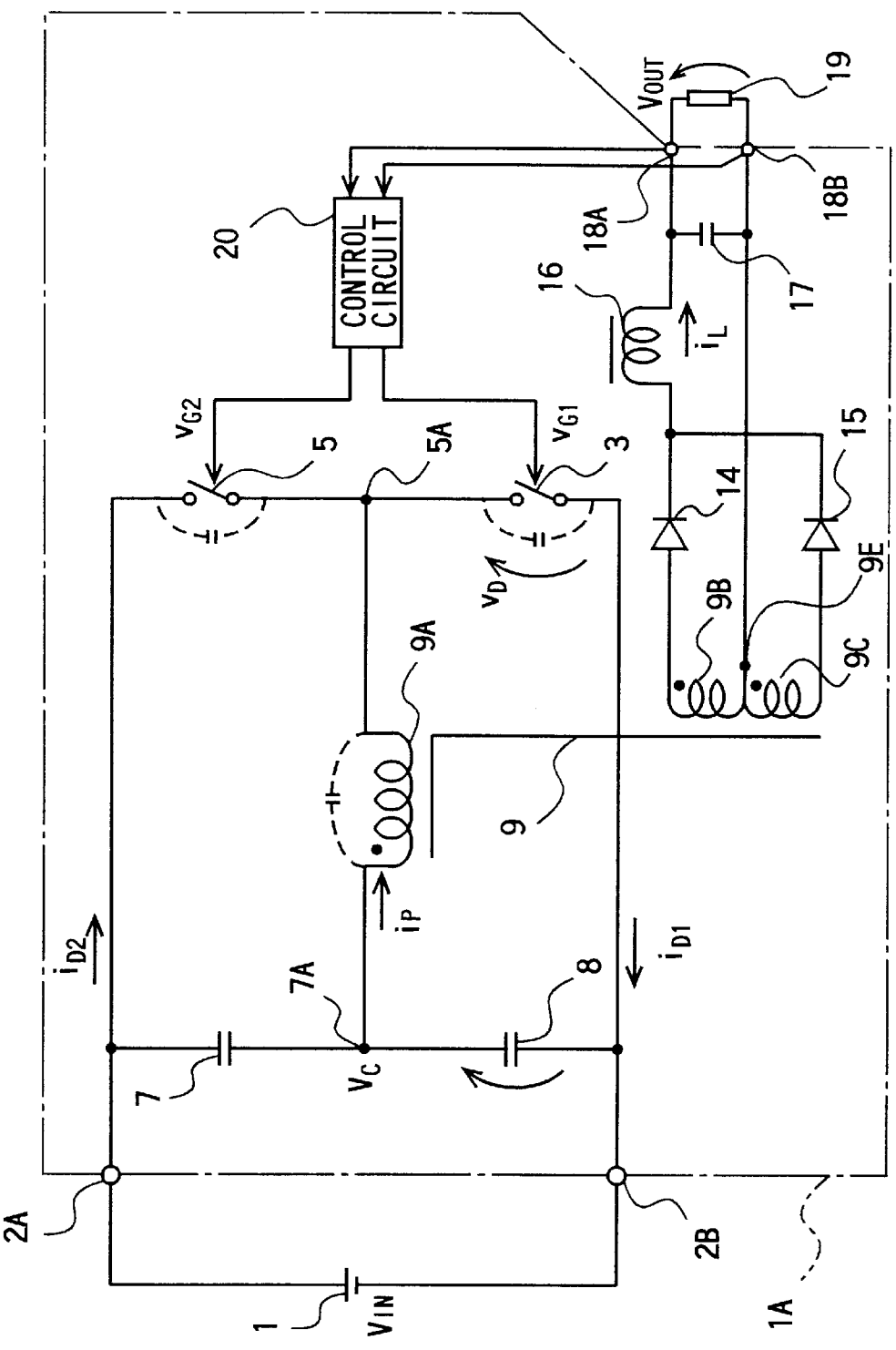
FIG. 13 is the circuit diagram of the switching power supply apparatus.
Figure 14:
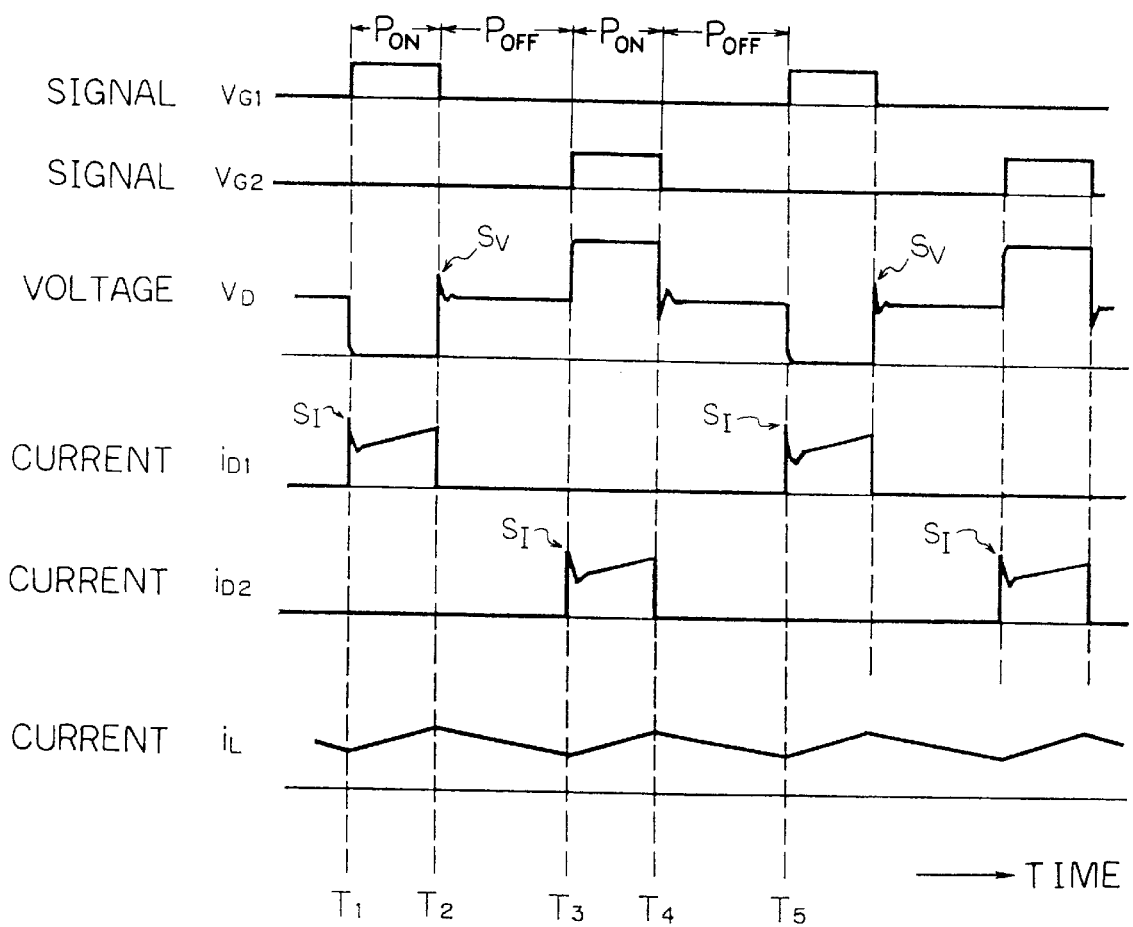
FIG. 14 is the waveform diagram of operation of the first prior art switching power supply apparatus.
Figure 15:
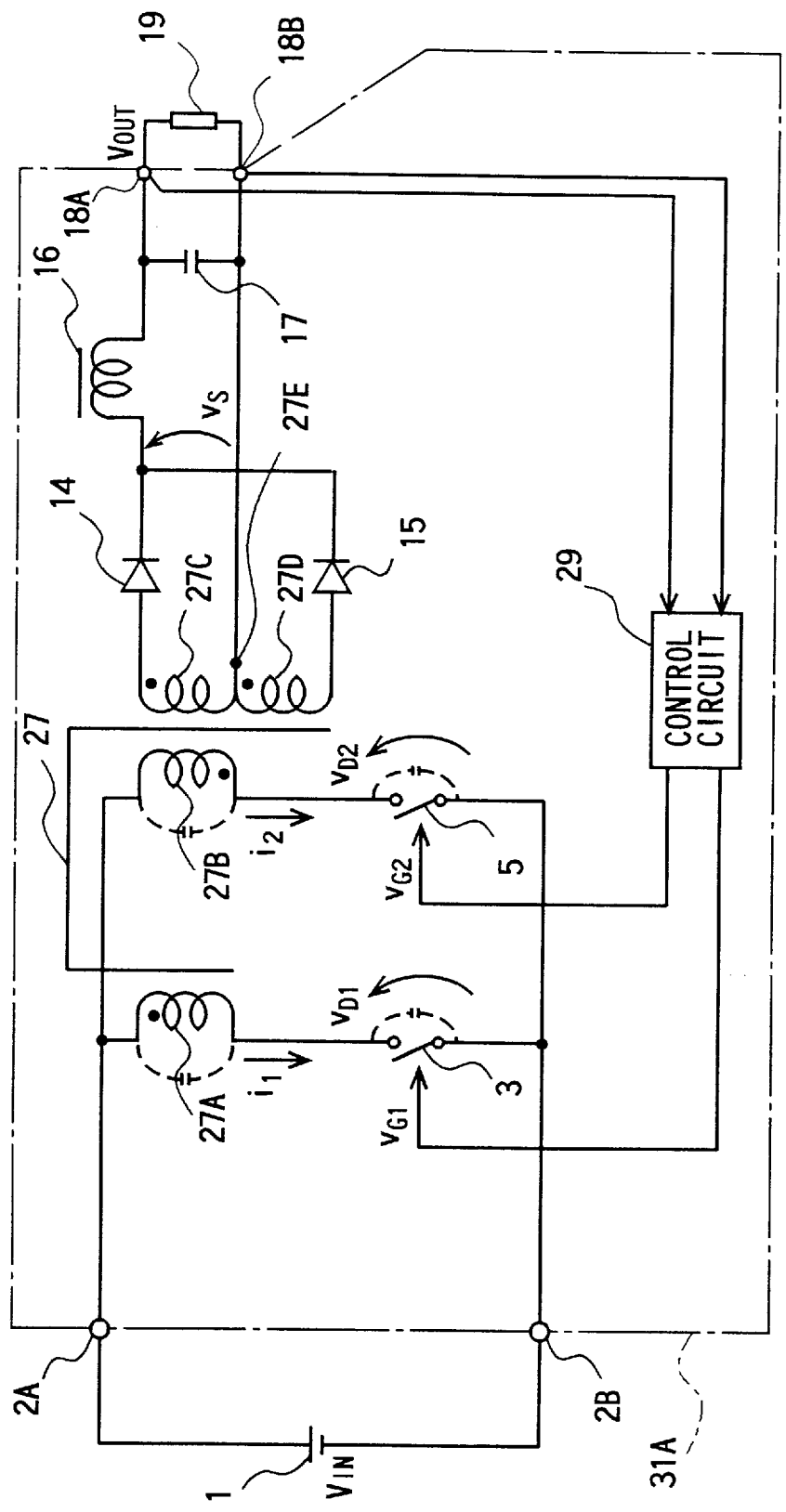
FIG. 15 is the circuit diagram of a second prior art switching power supply apparatus of the second prior art switching apparatus the second prior art.
Figure 16:
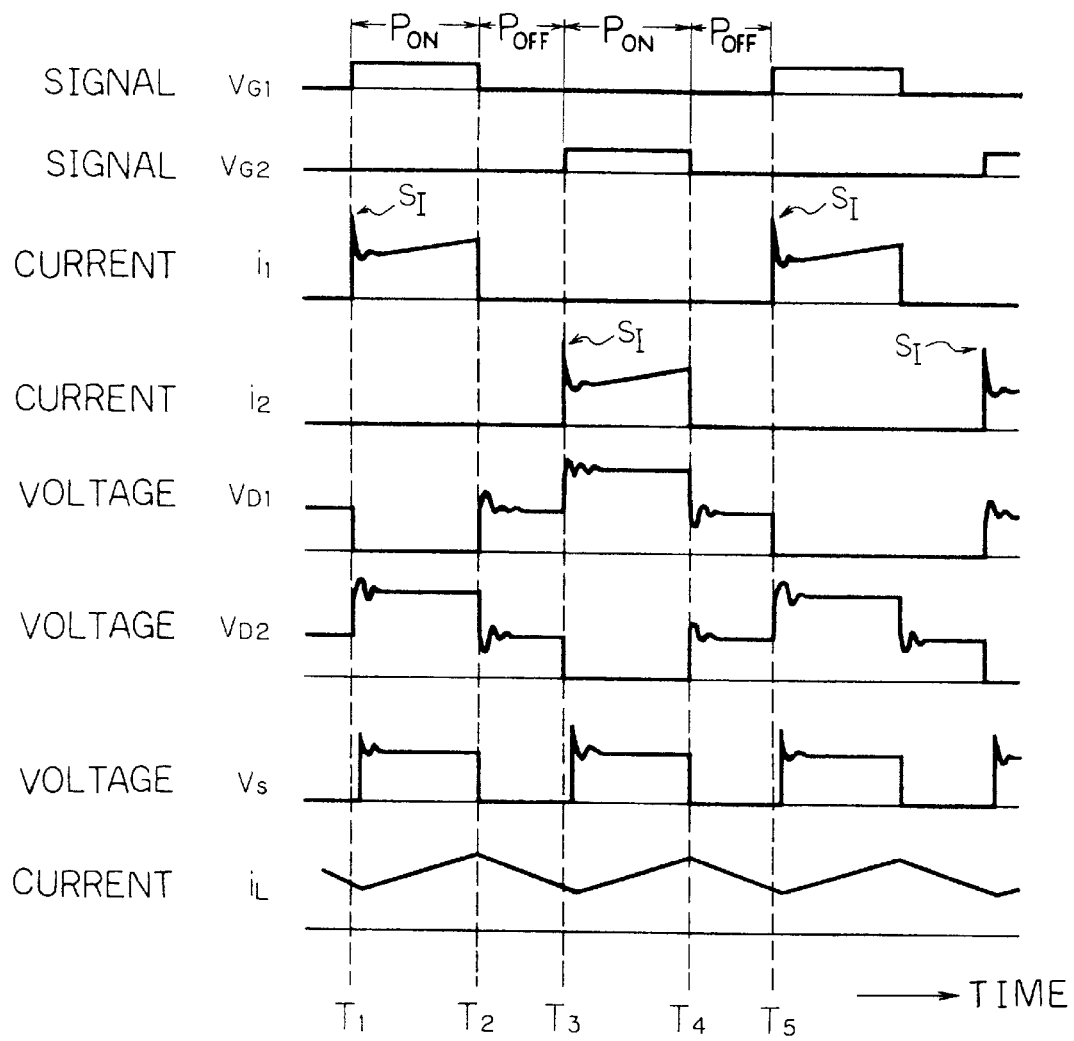
FIG. 16 is the waveform diagram of operation of FIG. 15.

Operation of the switching power supply apparatus configured above is described hereafter with reference to waveform diagrams of FIG. 12.

Referring to FIG. 12, the driving pulse signal $v_{C1}$ is applied to the first switching element 3 from the control circuit 43. The driving pulse signal $v_{C2}$ is applied to the second switching element 5 from the control circuit 43. The driving pulse signal $v_{C3}$ is applied to the third switching element 10 from the control circuit 43. The driving pulse signal $v_{C4}$ is applied to the fourth switching element 12 from the control circuit 43. Current $i_1$ passes through the first switching unit 34 and the first primary winding 39A of the transformer 39. Current $i_2$ passes through the second switching unit 56 and the second primary winding 39B of the transformer 39. Current $i_3$ passes through the auxiliary winding 39E of the transformer 39. Voltage $v_{D1}$ is applied to the first switching unit 34. Voltage $v_{D2}$ is applied to the second switching unit 56.

When the first switching element 3 is turned ON by input of the driving pulse signal $v_{C1}$ from the control circuit 43 at time $T_1$, the voltage $V_{IN}$ is applied to the first primary winding 39A of transformer 39. A voltage $V_{IN}/n$ is induced in the first secondary winding 39C of the transformer 39, and the rectifying diode 14 turns ON. A voltage $[V_{IN}/n-V_{OUT}]$ is applied to the inductor element 16, and a current $i_L$ passing through the inductor element 16 linearly increases. The current $i_1$ of the first primary winding 39A of the transformer 39 is the sum of an exciting current of the transformer 39 and a converted component current, which is the component such that a current passing through the first secondary winding 39C is converted into the current passing through the first primary winding 39A, and therefore, linearly increases. Consequently, an exciting energy is stored in the transformer 39 and the inductor element 16. At this time, though the second switching element 5 remains OFF, the third switching element 10 remains ON and the fourth switching element 12 remains OFF, operation of the circuit is not affected because the second diode 6 and the fourth diode 13 are reverse-biased and remain OFF.

When the driving pulse signal $v_{C1}$ of the control circuit 43 falls and the first switching element 3 turns OFF at time $T_2$, a leakage inductance of the transformer 39 causes the current $i_{P1}$ passing through the first primary winding 39A to flow continuously. The current $i_{P1}$ charges or discharges the parasitic capacitances connected equivalently parallel with the first switching unit 34, the second switching unit 56 and the transformer 39. Consequently, the voltage $v_{D1}$ applied to the first switching unit 34 increases, and the voltage $v_{D2}$ applied to the second switching unit 56 decreases. Simultaneously, a voltage induced in the auxiliary winding 39E decreases, and when the voltage falls to zero, the fourth diode 13 is turned ON by a voltage applied through the third switching element 10 of ON-state, and the bidirectional switching unit 25 becomes conductive.

During the ON-period of the fourth diode 13, the fourth switching element 12 is turned ON by the driving pulse signal $V_{C4}$ of the control circuit 43 at time $T_3$. Even if the ON-current is passes through the fourth diode 13 or through the fourth switching element 12, operation of the circuit does not change. When the bidirectional switching unit 25 becomes conductive, the auxiliary winding 39E of the transformer 39 is short-circuited, and the energy stored in the leakage inductance and exciting inductance of the transformer 39 is held.

In the above-mentioned operations, voltages induced in the first secondary winding 39C and the second secondary winding 39D of the transformer 39 fall to zero, and the voltage $V_{OUT}$ is applied to the inductor element 16. A secondary current is divided into a current passing through the secondary winding 39C and a current passing through the second secondary winding 39D of the transformer 39 so as to hold continuously the exciting energy, and therefore the first rectifying diode 14 and the second rectifying diode 15 turn ON.

When the bidirectional switching unit 25 is rendered non-conductive by turn-OFF of the third switching element 10 at time $T_4$, the parasitic capacitances connected equivalently parallel with the first switching unit 34, the second switching unit 56 and the transformer 39 are charged or discharged by the energy held in the transformer 39, and the voltage $v_{D1}$ applied to the first switching unit 34 increases. Simultaneously, the voltage $V_{D2}$ applied to the second switching unit 56 decreases. When the voltage $v_{D2}$ falls to zero, the second diode 6 turns ON. During the ON-period of the second diode 6, the second switching element 5 is turned ON by the driving pulse signal $v_{C2}$ of the control circuit 43 at time $T_5$. Even if the current $i_2$ passes through the second diode 6 or the second switching element 5, the operation of the circuit does not change.

When the second switching unit 56 turns ON, the voltage $V_{IN}$ is applied to the second primary winding 39B of the transformer 39, and the current $i_2$ of the second primary winding 39B rapidly increases. When a sufficient current is supplied to the second primary winding 39B of the transformer 39, the first rectifying diode 14 turns OFF, and the voltage $V_{IN}/n$ is induced in the second secondary winding 39D. Consequently, the voltage $[V_{IN}/n-V_{OUT}]$ is applied to the inductor element 16, and the current $i_L$ passing through the inductor element 16 linearly increases. The current $i_2$ of the second primary winding 39B of the transformer 39 is the sum of an exciting current of the transformer 39 and a converted component current, which is the component such that the current passing through the second secondary winding 39D is converted into the current passing through the second primary winding 39B, and therefore, linearly increases. Consequently, exciting energy is stored in the transformer 39 and the inductor element 16. At this time, even though the first and third switching elements 3 and 10 remain OFF and the fourth switching element 12 remains ON by the control circuit 43, operation of the circuit is not affected because the first diode 4 and the third diode 11 are reverse-biased and remain OFF.

When the driving pulse signal $V_{C2}$ of the control circuit 43 falls and the second switching element 5 turns OFF at time $T_6$, the leakage inductance of the transformer 39 causes the current $i_1$ of the first primary winding 39A to flow continuously, and therefore the current $i_1$ charges or discharges the parasitic capacitances connected in parallel with the first switching unit 34, the second switching unit 56 and the transformer 39. Consequently, the voltage $v_{D1}$ applied to the second switching unit 56 increases. Simultaneously, the voltage $V_{D1}$ of the first switching unit 34 decreases, and a voltage applied to the first primary winding 39A of the transformer 39 decreases. A voltage induced in the auxiliary winding 39E also decreases, and when the voltage falls to zero, the third diode 11 is turned ON by a voltage applied through the fourth switching element 12 of ON-state, and the bidirectional switching unit 25 becomes conductive. The third switching element 10 is turned ON by the driving pulse signal $V_{C3}$ of the control circuit 43 at time $T_7$ in ON-period of the third diode 11. Even if the current $i_3$ passes through the third diode 11 or through the third switching element 10, the operation of the circuit does not change. When the bidirectional switching unit 25 becomes conductive, the auxiliary winding 39E of the transformer 39 is short-circuited, and energy stored in the leakage inductance and the exciting inductance of the transformer 39 is held.

Voltages induced in the first secondary winding 39C and the second secondary winding 39D of the transformer 39 fall to zero, and the voltage $V_{OUT}$ is applied to the inductor element 16. A secondary current is divided into a current passing through the first secondary winding 39C and a current passing through the second secondary winding 39D of the transformer 39, so as to hold continuously the exciting energy, and therefore the first rectifying diode 14 and the second rectifying diode 15 turn ON.

When the fourth switching element 12 turns OFF and the bidirectional switching unit 25 becomes non-conductive at time $T_8$, the parasitic capacitances connected equivalently parallel with the first switching unit 34, the second switching unit 56 and the transformer 39 are charged or discharged by the energy stored in the transformer 39. The voltage $v_{D1}$ applied to the first switching unit 34 decreases. When the voltage $v_{D1}$ falls to zero, the first diode 4 turns ON. The first switching element 3 is turned ON by the driving pulse signal $v_{C1}$ of the control circuit 43 at time $T_9$ in ON-period of the first diode 4. Even if the current $i_1$ passes through the first diode 4 or through the first switching element 3, the operation of the circuit does not change.

The current $i_1$ passing through the first primary winding 39A of the transformer 39 once decreases to charge or discharge the parasitic capacitances, but when the first switching unit 34 turns ON, the voltage $V_{IN}$ is applied to the first primary winding 39A of the transformer 39, and the current $i_1$ of the first primary winding 39A rapidly increases. When a sufficient current is supplied to the first primary winding 39A of the transformer 39, the second rectifying diode 15 turns OFF, and the voltage $V_{IN}/n$ is induced in the first secondary winding 39C. Therefore, the voltage $[V_{IN}/n-V_{OUT}]$ is applied to the inductor element 16. Then, the above-mentioned operation is repeated.

The ON-period of the first switching unit 34 is selected to be equal to the ON-period of the second switching unit 56, and is designated as $P_{ON}$. The OFF-period from turn-OFF of the first switching unit 34 to turn-ON of the second switching unit 56 is selected to be equal to the OFF-period from turn-OFF of the second switching unit 56 to turn-ON of the first switching unit 34, and is designated as $P_{OFF}$. When time periods from $T_2$ to $T_3$, from $T_4$ to $T_5$, from $T_6$ to $T_7$ and from $T_8$ to $T_9$ are negligibly short and therefore disregarded, equation (9) is derived from the reset condition of the inductor element 16.

$$(V_{IN}/n - V_{OUT}) \times P_{ON} = V_{out} \times P_{OFF} \tag{9}$$

Therefore, from equation (9), $V_{OUT}$ is represented as follows:

$V_{OUT} = \delta V_{IN}/n$, where, $\delta = P_{ON}/(P_{ON}+P_{OFF})$.

Therefore, the output voltage $V_{IN}$ can be controlled by adjusting the ON-OFF ratio ($P_{ON}/P_{OFF}$) of the first switching element 3 and the second switching element 5. When the time periods from $T_2$ to $T_3$, from $T_4$ to $T_5$, from $T_6$ to $T_7$ and from $T_8$ to $T_9$ are taken into account, the output voltage $V_{OUT}$ decreases. A desired output voltage $V_{OUT}$ can be attained by increasing the value of $\delta$ corresponding to the decrease of the output voltage. According to the fourth embodiment, electric charges of the parasitic capacitances of the first to fourth switching elements 3, 5, 10 and 12 and the distributed capacitance of the transformer 39 are discharged immediately before turn-ON of the first to fourth switching elements 3, 5, 10 and 12. Consequently, the surge current generated by short circuit is reduced, and efficiency is improved and generation of noise is suppressed.

Surge voltages generated at turn-OFF of the first and second switching elements 3 and 5 caused by the leakage inductance of the transformer 39 is effectively absorbed through the transformer 39 by turn-ON of the third and fourth diodes 11 and 13 of the bidirectional switching unit 25. Consequently, generation of the surge voltage is greatly reduced. Surge voltages generated at turn-OFF of the third switching element 10 and the fourth switching element 12 of the bidirectional switching element 25 are absorbed through transformer 39 into the direct current source 1 by turn-ON of the first and second diodes 4 and 6. Therefore, generation of the surge voltages is prevented.

Energy of charging or discharging the parasitic capacitances depends on the energy stored in the exciting inductance and the leakage inductance of the transformer 39. The energy of charging or discharging can be further increased by connecting inductor elements in series with the first secondary winding 39C and the second secondary winding 39D of the transformer 39. Discharging of the parasitic capacitances of the first and second switching units 34 and 56 and the distributed capacitance of the transformer 39 can be aided by decreasing the inductance of the transformer 39 and reverse-exciting it.

In the circuit diagram shown in FIG. 11, the junction 45A between the third switching element 10 and the fourth switching element 12 of the bidirectional switching element 25 is connected to the negative input terminal 2B (circuit ground) of the direct current source 1. Therefore, levels of the driving pulse signals $V_{C3}$ and $V_{C4}$ of the control circuit 43 can be flexibly selected. The junction 45A can be connected to the positive terminal 2A of the direct current source 1. A desired voltage can be applied to the junction 45A by dividing the voltage $V_{IN}$ of the direct current source 1. According to the fourth embodiment, since the voltage of the junction 45A between the third and fourth switching units 10 and 12 can be flexibly selected as mentioned above, design of the control circuit 43 is easy to implement.

In the configuration shown in FIG. 11, even if a capacitor is added to each parasitic capacitance connected in equivalently parallel with the first and second switching units 34 and 56, the bidirectional switching unit 45 and transformer 39, the basic operation of the switching power supply apparatus is not affected. Inclinations of rise edges of the voltages applied to the first to fourth switching units 3, 5, 10 and 12 at turn-OFF are decreased by addition of respective capacitors, and therefore a power loss generated in switching operation can be further reduced. Consequently, the switching power supply apparatus having a high efficiency, low noise and a high switching frequency is realizable.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A switching power supply apparatus comprising:
at least two capacitors for dividing an input voltage to produce a divided voltage,
a transformer having a primary winding,
two switching means for switching a direction of application of said divided voltage to generate an alternating current output voltage to said primary winding, and
bidirectional switching means for short-circuiting said primary winding during nonconductive periods of said two switching means.

2. A switching power supply apparatus comprising:
a serially-coupled pair of first switching means and second switching means connected across terminals of a direct current source, said first switching means and said second switching means alternately turning-ON and turning-OFF, respectively,
a capacitor connected at one end to one of said terminals of said direct current source,
a transformer comprising a primary winding and at least one secondary winding, one end of said primary winding being connected to another end of said capacitor and the other end of said primary winding being connected to the junction between said first switching means and said second switching means,
bidirectional switching means connected in parallel with said primary winding,
rectifying and smoothing means operably connected to said at least one secondary winding so as to rectify and smooth output AC current from said at least one secondary winding, and
control means for producing and applying control signals to said first and second switching means and said bidirectional switching means by receiving an output of said rectifying and smoothing means so that said bidirectional switching means becomes conductive during nonconductive periods of said first switching means and said second switching means, thereby passing a current substantially in continuity through said primary winding.

3. A switching power supply apparatus in accordance with claim 2, wherein a serially-coupled pair of a first capacitor and a second capacitor are connected across said terminals of said direct current source, and said one end of said primary winding is connected to the junction between said first capacitor and said second capacitor.

4. A switching power supply apparatus comprising:
a serially-coupled pair of first switching means and second switching means connected across terminals of a direct current source, said first switching means and said second switching means alternately turning-ON and turning-OFF, respectively,
a capacitor connected at one end to one of said output terminals of said direct current source,
a transformer comprising a primary winding, an auxiliary winding and at least one secondary winding, one end of said primary winding being connected to another end of said capacitor and the other end of said primary winding being connected to the junction between said first switching means and said second switching means,
bidirectional switching means connected in parallel with said auxiliary winding,
rectifying and smoothing means operably connected to said at least one secondary winding so as to rectify and smooth output AC current from said at least one secondary winding, and
control means for producing and applying control signals to said first and second switching means and said bidirectional switching means by receiving an output of said rectifying and smoothing means so that said bidirectional switching means becomes conductive during nonconductive periods of said first switching means and said second switching means, thereby passing a current substantially in continuity through said primary winding.

5. A switching power supply apparatus in accordance with claim 4, wherein a serially-coupled pair of a first capacitor and a second capacitor are connected across said output terminal of said direct current source, and said one end of said primary winding is connected to the junction between said first capacitor and said second capacitor.

6. A switching power supply apparatus comprising:
a transformer having at least two windings,
at least two switching means for alternately applying an input voltage to said at least two windings, and
bidirectional switching means for short-circuiting said winding of said transformer during OFF-states of said at least two switching means.

7. A switching power supply apparatus comprising:
a transformer having a first primary winding and a second primary winding connected at each of one end thereof to one terminal of a direct current source, and at least one secondary winding,
first switching means connected at one end thereof in series with said first primary winding and connected at another end thereof to the other terminal of said direct current source, and alternately turning-ON and turning-OFF,
second switching means connected at one end thereof in series with said second primary winding and connected at another end thereof to said other terminal of said direct current source, and alternately turning-ON and turning-OFF with said first switching means,
bidirectional switching means connected between the junction of said first primary winding and said first switching means and the other junction of said second primary winding and said second switching means,
rectifying and smoothing means operably connected to said secondary winding for rectifying and smoothing a current of said secondary winding, and
a control circuit receiving an output of said rectifying and smoothing means, the control circuit controlling said first switching means, said second switching means and said bidirectional switching means so that said bidirectional switching means becomes conductive during OFF-states of both said first and second switching means, and thereby continuously holds energy stored in said transformer.

8. A switching power supply apparatus comprising:
a transformer having a first primary winding and a second primary winding connected at each one end thereof to one terminal of a direct current source, at least one secondary winding and an auxiliary winding, first switching means connected at one end thereof in series with said first primary winding and connected at another end thereof to the other terminal of said direct current source, and alternately turning-ON and turning-OFF, second switching means connected at one end thereof in series with said second primary winding and connected at another end thereof to said other terminal of said direct current source, for alternately turning-ON and turning-OFF with said first switching means, bidirectional switching means connected in parallel with said auxiliary winding, rectifying and smoothing means operably connected to said secondary winding for rectifying and smoothing a current of said secondary winding, and a control circuit receiving an output of said rectifying and smoothing means, the control circuit controlling said first switching means, said second switching means and said bidirectional switching means so that said bidirectional switching means becomes conductive during OFF-states of both said first and second switching means, and thereby continuously holds energy stored in said transformer.

* * * * *